United States Patent
Asthana et al.

(10) Patent No.: US 9,300,548 B2
(45) Date of Patent: Mar. 29, 2016

(54) PROVIDING DYNAMIC RELIABILITY AND SECURITY IN COMMUNICATIONS ENVIRONMENTS

(75) Inventors: Abhaya Asthana, Framingham, MA (US); Marc S. Benowitz, Hillsborough, NJ (US); Uma Chandrashekhar, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 589 days.

(21) Appl. No.: 13/273,415

(22) Filed: Oct. 14, 2011

(65) Prior Publication Data

US 2013/0097304 A1  Apr. 18, 2013

(51) Int. Cl.
*G06F 15/173* (2006.01)
*H04L 12/24* (2006.01)
*G06F 9/50* (2006.01)

(52) U.S. Cl.
CPC .............. *H04L 41/5006* (2013.01); *G06F 9/50* (2013.01); *H04L 41/5025* (2013.01); *H04L 41/5096* (2013.01)

(58) Field of Classification Search
CPC ......... G06F 15/173; G06F 9/50; H04L 12/24; H04L 41/5006; H04L 41/5003; H04L 41/5009; H04L 41/5019
USPC .......................................................... 709/224
See application file for complete search history.

(56) References Cited

U.S. PATENT DOCUMENTS

| 2010/0076856 | A1* | 3/2010 | Mullins | ............................ 705/26 |
| 2011/0055707 | A1* | 3/2011 | Kimmet | ..................... G06F 8/61 715/735 |
| 2011/0153727 | A1* | 6/2011 | Li | .......................... G06F 9/5055 709/203 |
| 2012/0105199 | A1* | 5/2012 | Sanders | ................ H04L 67/306 340/5.81 |

FOREIGN PATENT DOCUMENTS

| JP | 2010-152738(A) | 7/2010 |
| JP | 2011-039740(A) | 2/2011 |
| JP | 2011-197866(A) | 10/2011 |

OTHER PUBLICATIONS

Koslovski et al (Reliability Support in Virtual Infrastructures, Cloud Computing Technology and Science (CLOUDCOM), 210 IEEE Second International Conference on, IEEE Nov. 2010 ( Nov. 30, 2010), pp. 49-58.*

(Continued)

*Primary Examiner* — Dhairya A Patel
(74) *Attorney, Agent, or Firm* — Wall & Tong, LLC

(57) ABSTRACT

A dynamic reliability and security capability is provided. The dynamic reliability and security capability may be configured to support use of a dynamic reliability profile (DRP) that specifies the reliability parameters of a customer both as function of time and as a function of the requirements of the application or service of the customer. The reliability parameters may specify reliability requirements and/or goals of the customer, thereby providing a time varying requirements/ goals profile. The dynamic reliability and security capability may be configured to dynamically configure the cloud resources to provide the required reliability as specified by the DRP. The RSG capability may be configured to subsequently monitor and meter the behavior to assure that the specified reliability is in fact being delivered, which may include use of self-healing capabilities to provide service assurance.

20 Claims, 10 Drawing Sheets

(56) References Cited

OTHER PUBLICATIONS

Buyya et al ("Cloudbus Toolkit for Market-Oriented Cloud Computing", Dec. 1, 2009. Cloud Computing. Springer Berlin Heidelberg. Berlin. Heidelberg. pp. 24-44.*

Guilherme Koslovski et al: "Reliability Support in Virtual Infrastructures," Cloud Computing Technology and Science (CLOUDCOM), 2010 IEEE Second International Conference on, IEEE, Nov. 30, 2010, pp. 49-58, XP031900236, DOI: 10.1109/CLOUDCOM.2010. 23, ISBN: 978-1-4244-9405-7.

Rajkumar Buyya et al: "Cloudbus Toolkit for Market-Oriented Cloud Computing," Dec. 1, 2009, Cloud Computing, Springer Berlin Heidelberg, Berlin, Heidelberg, pp. 24-44, XP01913551, ISBN: 978-3-642-10664-4.

Buyya R et al: "Market-Oriented Cloud Computing: Vision, Hype, and Reality for Delivering IT Services as Computing Utilities," High Performance Computing and Communications, 2008. HPCC '08. 10$^{th}$ IEEE International Conference on, IEEE, Piscataway, NJ, USA, Sep. 25, 2008, pp. 5-13, XP031344187, ISBN: 978-0-7695-3352-0.

Jan. 30, 2013 The International Search Report and the Written Opinion of the International Searching Authority, Or the Declaration, in PCT/US2012/058225, Alcatel Lucent, Applicant, 11 pages.

Koslovski et al., "Reliability Support in Virtual Infrastructures," CloudCom 2010, 2$^{nd}$ International Conference on Cloud Computing Technology and Science, Nov. 30, 2010, pp. 1-10.

Buyya et al., "Cloudbus Toolkit for Market-Oriented Cloud Computing," CloudCom 2009, 1st International Conference on Cloud Computing, Dec. 1, 2009, pp. 1-21.

KR Office Action received in corresponding KR Application No. 2014-7009686, dated Dec. 22, 2014, pp. 1-7.

* cited by examiner

US 9,300,548 B2

PROVIDING DYNAMIC RELIABILITY AND SECURITY IN COMMUNICATIONS ENVIRONMENTS

TECHNICAL FIELD

The invention relates generally to communications environments and, more specifically but not exclusively, to providing reliability and security in communications environments.

BACKGROUND

Cloud computing provides a way of delivering services and resources to a customer over the Internet using rapid, self-service provisioning, while insulating the customer of the services and resources from the management of the underlying infrastructure. However, despite the various advantages of cloud computing and the recent growth in use of cloud computing, many customers still struggle with certain concerns, such as the reliability and security of cloud computing, among others.

SUMMARY

Various deficiencies in the prior art are addressed by embodiments for providing reliability and security within a cloud environment.

In one embodiment, an apparatus includes a processor configured to receive a dynamic reliability profile (DRP) associated with a customer of a cloud provider where the DRP specifies reliability parameters of the customer as a function of both time and requirements of an application or service of the customer, and determine configuration of cloud resources for the customer based on the DRP of the customer.

In one embodiment, a computer-readable storage medium stores instructions which, when executed by a computer, cause the computer to perform a method including receiving a dynamic reliability profile (DRP) associated with a customer of a cloud provider where the DRP specifies reliability parameters of the customer as a function of both time and requirements of an application or service of the customer, and determining configuration of cloud resources for the customer based on the DRP of the customer.

In one embodiment, a method includes receiving a dynamic reliability profile (DRP) associated with a customer of a cloud provider where the DRP specifies reliability parameters of the customer as a function of both time and requirements of an application or service of the customer, and determining configuration of cloud resources for the customer based on the DRP of the customer.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
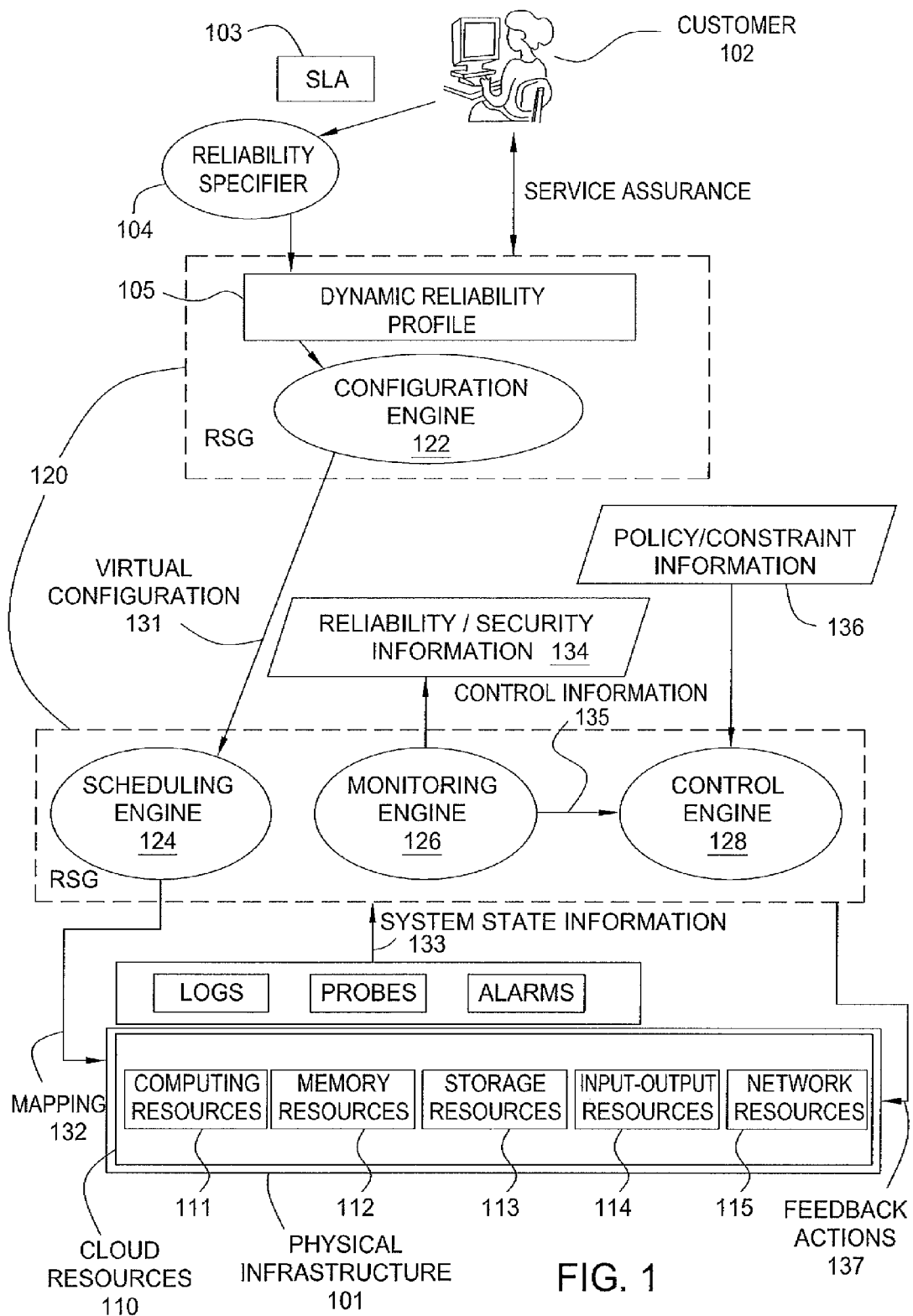
FIG. 1 depicts one embodiment of a cloud system including a Reliability and Security Guardian (RSG)

In general, a reliability and security capability is depicted and described herein, although various other capabilities also may be presented herein.

Cloud computing provides a way of delivering services and resources to a customer over the Internet using rapid, self-service provisioning, while insulating the customer of the services and resources from the management of the underlying infrastructure. In many cases, the service being offered by cloud providers is utility computing, which is typically distinguished based on the level of abstraction of the software of the cloud system and the level of management of the resources of the cloud system. On one end of the spectrum, for example, is an implementation in which the abstraction is at the physical hardware level and the customer can control entire software stack, kernel upwards (although this makes it is difficult to offer failover capabilities). On the other end of the spectrum, for example, is an implementation that is application domain specific for web applications, with stateless computation and a stateful storage system. It is noted that other implementations also may fall within the middle part of the spectrum.

Cloud computing has many associated advantages. In general, cloud computing enables high scalability, configurability, elasticity of resource availability on a dynamic basis, ease of return, and like advantages. Cloud computing provides extensive capability for hardware provisioning to create an appearance of "infinite" computing resources available on demand, quickly enough to follow load surges, thereby eliminating the need for advance provisioning. Cloud computing, given its ease of sizing, enables implementation of less expensive failover solutions, because of the on-demand or pay-as-you go nature of cloud services. In cloud computing, the customer pays for use of computing resources on a short term basis as needed (e.g. processors by the hour, storage by the day, and the like), and may request and release them as needed. Cloud computing also allows for economies of scale (e.g., factors of improvement in electricity, net bandwidth, operations, software and hardware, and the like), permits statistical multiplexing to increase resource utilization, and simplifies operations. Various other advantages of cloud computing also will be appreciated.

In spite of the foregoing advantages, however, and the growth of cloud computing, many customers still struggle to resolve questions about its reliability and security. For example, sharing of physical resources raises security issues (e.g., data visible to others, data imprints left over after failure or exit, and the like). Additionally, barriers to the widespread adoption of cloud services cannot be ignored, such as: security/data privacy and jurisdictional issues, infancy/variability of Service Level Agreements (SLAs), performance and access control/latency, reliability and vendor neutrality, the ability to integrate cloud services with business applications, the relative immaturity and continuing evolution of the Cloud Services model, and the like. Furthermore, it is noted that enterprises that deploy mission-critical applications typically seek assurances of reasonable system responsiveness through SLAs, protection through data isolation in a multitenant environment, failover protection to minimize service outages, predictable recharge rates, and various related services and capabilities. Moreover, assurances for mission-critical applications are not quantifiable, and measures to highlight the cost/benefit of public cloud (e.g., providing convenience) versus private cloud (e.g., providing better control and assurance of security and privacy) are not clear. As such, the level of abstraction of the software of the cloud system and the level of management of the resources of the cloud system have the potential to be key differentiators between cloud offerings.

In one embodiment, at least a portion of the foregoing concerns and/or needs may be addressed through use of one or more of new system architectures, new devices/elements, new programming models, new development environments, and new testing methodologies, where such architectures, devices/elements, models, environments, and/or methodologies may be configured to provide self-reliable systems based on a deeper understanding of SLA requirements of customers for performance, availability, security, resiliency, usage accounting, and the like. It is noted that this would enable both public and private cloud computing to become more reliable and secure and, thus, suitable for mission-critical uses.

In one embodiment, at least a portion of the foregoing concerns and/or needs may be addressed through use of a Reliability and Security Guardian (RSG) capability in a cloud system.

The RSG capability may be configured to support use of a dynamic reliability profile (DRP), which may be included as part of a customer SLA, that specifies the reliability parameters of a customer both as function of time and as a function of the requirements of the application or service of the customer. The reliability parameters may specify reliability requirements and/or goals of the customer, thereby providing a time varying requirements/goals profile. The RSG capability may be configured to dynamically configure the cloud resources to provide the required reliability as specified by the DRP. The RSG capability may be configured to subsequently monitor and meter the behavior to assure that the specified reliability is in fact being delivered, which may include use of self-healing capabilities to provide service assurance. It is noted that, since reliability is related to availability, the dynamic reliability profile also may be referred to herein as a dynamic reliability/availability profile.

The RSG capability may be configured to perform or provide one or more of: increasing the reliability of services delivered to customers as an uninterrupted experience; enabling systems to automatically re-balance to functional availability levels without user-visible impact or manual intervention; providing dynamic assurance of Service Level Agreement (SLA) requirements for performance, reliability, availability, security, and resiliency usage accounting, and the like, thereby enabling public and/or private cloud computing to become more reliable, secure, and resilient and, thus, suitable for mission-critical uses; representing reliability requirements/goals of a customer as a function of both time and the requirements of the application or service; providing a self-reliable system configured to dynamically configure cloud resources to provide the required/desired reliability; monitoring and metering the system to assure that the required/desired reliability is being satisfied; monitoring end-to-end service availability across an entire solution in near-real time with secure collection and centralization of available network and service data; generating a reliability integrity meter that derives critical end-to-end service availability metrics from available network and service data and triggers appropriate recovery and control actions; provide preventive control capabilities that enable generation of indications of impending issues and proactive in-service testing to constantly detect and troubleshoot critical problems; and the like.

The RSG capability may be configured to provide various other associated functions. In other words, it is as if the customer can dial-a-reliability and the cloud system reacts in an attempt to deliver it.

In one embodiment, the RSG capability is deployed within the infrastructure layer. It is noted that a general trend in cloud computing is toward industry-aligned, dynamic, self learning, and self-managed solutions. In one embodiment, solution level capabilities are developed to enable construction of organic, self-aware, self-healing networks, thereby enabling cloud providers to provide assurance when and as needed by the customer. It is further noted that such organic, self-aware, self-healing networks can support various customer applications, including high-value applications. In one embodiment, in order to support such applications (including high value applications), (1) reliability is provided as a service (denoted as RaaS, Reliability as a Service) within the platform layer and (2) a capability referred to as the RSG capability is provided within the infrastructure layer, where the RSG capability is configured to provide functions such as dynamic configuration, resource scheduling for high availability, integrity metering, in-service robustness testing, prediction and prevention of failures, correlation of network events to recognize and diagnose brink-of-failure and breach-of-security conditions, and the like, as well as various combinations thereof. In this manner, a dynamically self-reliable cloud system may be provided.

In one embodiment, the RSG capability is deployed within the customer network. This overcomes a security barrier associated with existing cloud systems. Namely, in existing cloud systems, due to strict security considerations, the cloud service providers seldom allow customers access to their internal management systems or to their performance and fault data. For example, in rare cases "read only" access by customers to the alarm and performance data may be allowed for purposes of off-line analysis. By contrast, where RaaS is supported, the RSG capability may reside within the customer network, such that interfaces between the RSG capability and various other entities within the customer network (e.g., data collection entities, management entities, and the like) may be implemented as trusted interfaces. There is no need for a demilitarized (DMZ) function (e.g., encrypted data routed through a secure virtual private network (VPN)), as all data is accessed and analyzed locally within the customer domain. Furthermore, proactive control, based on the monitored data, is now possible since no external entity is involved. Thus, overcoming the existing security hurdles by embedding the RSG capability within the customer network enables the construction of truly organic, self-aware, self-healing networks.

The cloud system may support such functions via one or more capabilities, such as via a Reliability and Security Guardian (RSG) as depicted and described herein. An exemplary RSG within an exemplary cloud system is depicted and described with respect to FIG. 1.

FIG. 1 depicts one embodiment of a cloud system including a Reliability and Security Guardian (RSG) capability.

As depicted in FIG. 1, the cloud system 100 includes physical infrastructure 101 that is managed by a cloud provider providing cloud services for a customer 102. The cloud system 100 also includes an a Reliability/Security Guardian (RSG) 120 that is configured to enable the cloud provider to provide service assurance to customer 102 within the context of providing cloud services to customer 102 using physical infrastructure 101.

The physical infrastructure 101 includes cloud resources 110 and, optionally, may include any other physical infrastructure which may be deployed by a cloud provider to support cloud services.

The customer 102 may be any suitable type of customer which may access and use cloud resources 110. For example the customer 102 may be an enterprise customer, a home customer, and the like.

The customer 102 is able to provide information which may be used to generate an SLA 103 for the customer 102. An SLA is typically specific to a customer and defines the virtual environment of the customer, and the customer is typically only interested in the SLA being met relative to their virtual environment and not to the entire infrastructure of the cloud system as a whole. The cloud provider typically supports multiple customers (although, as noted above, a single customer 120 is depicted and described herein for purposes of clarity). As a result, a cloud provider typically ensures that the infrastructure of the cloud system is able to meet the SLAs for all of the virtual environments of all of its customers. It is noted that the cloud system 100 is configured to enable the cloud provider to provide this capability.

The customer 102 is able to provide information which may be used to generate a dynamic reliability profile (DRP) 105 for the customer 102. The DRP 105 for customer 102 may be specified directly by customer 102, may be specified by customer 102 within the SLA 103, may be determined via processing of information entered for the SLA 103 and/or processing of the SLA 103 itself (e.g., by a reliability specifier 104 and/or any other suitable system or component), and the like, as well as various combinations thereof. The DRP 105 may be provided at any suitable granularity (e.g., for a particular application, for a set of applications, for a particular service, for a set of services, for one or more services and one or more applications, for the customer 102 as a whole, and the like). As depicted in FIG. 1, the DRP 105 for customer 102 is provided to RSG 120.

The cloud resources 110 may be configured for use by customer 102. The cloud resources 110 may include computing resources 111, memory resources 112, storage resources 113, input-output resources 114, and network resources 115. It is noted that the cloud resources 110 may be assumed to be virtually infinite (i.e., that there are enough cloud resources 110 to meet any customer demands). It is further noted that the cloud resources 110 may be distributed and can be grouped dynamically. The typical manner in which cloud resources 110 may be assigned for use by customer 120 will be understood by one skilled in the art. Although primarily depicted and described with respect to specific types of cloud resources 110, it will be appreciated that cloud resources 110 may include any other types of cloud resources which may be configured for use by customers.

The RSG 120 is configured to provide various functions enabling cloud system 100 to operate as a self-reliable system. For example, RSG 120 may be configured to receive DRP 105 of customer 102 and to dynamically configure the cloud resources 110 of cloud system 100 to provide the required reliability as specified by the DRP 105. The RSG 120 also may be configured to subsequently monitor and meter the behavior to assure that the specified reliability is in fact being delivered. The RSG 120 also may be configured to provide various other associated functions. It is noted that, as represented in FIG. 1, RSG 120 may be implemented in a centralized or distributed manner.

The RSG 120 includes four functional components: a configuration engine (CE) 122, a scheduling engine (SE) 124, a monitoring engine (ME) 126, and a control engine (CE) 128. It is noted that the four functional components may be implemented using one or more physical devices (e.g., the functions of RSG 120 may be centralized in a single system, distributed across one or more systems, and the like). Accordingly, RSG 120 is represented using dotted-line boxes intended to illustrate the various ways in which the four functional components may be implemented within cloud system 100.

The CE 122 receives the DRP 105 defined by the customer 102 (or SLA 103 including the DRP 105), and uses the DRP 105 to dynamically generate a virtual configuration 131 for customer 102. The virtual configuration 131 specifies a virtual configuration for the customer 102 that satisfies the DRP 105 of customer 102 (e.g., satisfying the requirements and/or goals of DRP 105). The virtual configuration 131 may be specified as a function of time. The CE 122 may dynamically generate the virtual configuration 131 that satisfies the DRP 105 while also accounting for the current state of cloud system 100 and/or policies/constraints imposed by the cloud system 100. The CE 122 provides the virtual configuration 131 to SE 124. The CE 122 may provide various other functions as discussed herein.

The SE 124 receives the virtual configuration 131 from CE 122. The SE 124 maps the virtual configuration 131 onto the physical infrastructure 101 (e.g., onto cloud resources 110) at the appropriate time as governed by DRP 105 and the current state of cloud system 100 and/or policies/constraints imposed by the cloud system 100. The mapping determined by SE 124 is denoted as mapping 132. The SE 124 may specify the requisite type of redundancy and/or recovery scheme(s) associated with implementation of the DRP 105. It is noted that, just as DRP 105 may be specified at any suitable granularity, the associated mapping 132 may be provided at any suitable granularity. The SE 124 is configured to implement mapping 132 within the physical infrastructure 101 (e.g., via configuration of physical infrastructure 101 to enable use of cloud resources 110 by the customer 102) such that customer 102 may then utilize the cloud resources 110. The SE 124 may provide various other functions as discussed herein.

The ME 126 observes the state of the components of the physical infrastructure 101 (e.g., computing resources 111, memory resources 112, storage resources 113, input-output resources 114, and network resources 115, as well as any other associated physical components or resources, of cloud resources 110). The ME 126 observes the state of the components of the physical infrastructure 101 by receiving and analyzing system state information 133 (e.g., alarms, probes, log files, and the like, as well as various combinations thereof) received at ME 126 from physical infrastructure 101. The ME 126 translates the observed state of the components of the physical infrastructure 101 into the state of the virtual environment of the customer 102. The ME 126 may be configured to capture reliability and security related events and states as reliability/security information 134 (which, in at least some embodiments, may be represented as a Reliability Integrity Meter (RIM)). The ME 126 may be configured to determine control information (denoted as control information 135) for use by CE 128 (e.g., reactive control information for use by the CE 128 in reacting to events or conditions in the cloud system 100, predictive preventative control information for use by the CE 128 in preventing a potential event or condition from occurring in the cloud system 100, and the like, as well as various combinations thereof). The ME 126 may provide various other functions as discussed herein.

The CE 128 is configured to receive the control information 135 from the ME 126 and to receive policy/constraint information 136 (e.g., which may be specified as part of SLA 103, DRP 105, and the like, as well as various combinations thereof), and to use the control information 135 and the policy/constraint information 136 to determine feedback actions 137 adapted for use in controlling/configuring the physical infrastructure 101 of cloud system 100 (e.g., cloud resources 110). The CE 128 provides the feedback actions 137 into the physical infrastructure 101 to control/configure the physical infrastructure 101 of cloud system 100. The feedback actions 137 may include both reactive feedback action (e.g., reacting to an identified event(s) or condition) and/o predictive preventive feedback actions (e.g., for preventing a predicted event(s) or condition(s) from occurring). For example, CE 128 may trigger recovery actions when a failure is detected and/or initiate preventive measures to avoid a failure from occurring. The CE 128 may provide various other functions as discussed herein.

As depicted in FIG. 1, the components of RSG 120 may be embedded within cloud system 100 in any suitable manner. In one embodiment, for example, the components of RSG 120 may be embedded within the infrastructure, platform, and service layers of the cloud system 100. As will be appreciated from FIG. 1 and other descriptions provided herein, the self-reliable nature of cloud system 100 may be characterized by one or more of following features/benefits: (1) providing service availability to clients regardless of hardware and/or software failure or disruption, (2) securing services, data, and infrastructure from attack and ensuring privacy of personal data, (3) providing flexible and dynamic resource allocation in real time based upon event or policy, i.e. scalability, (4) predictable performance across a wide range of workload demands with acceptable economics in delivery. Various other features/benefits which may be realized from use of embodiments of cloud system 100 will be appreciated from FIG. 1 and other descriptions provided herein.

As described herein, DRP 105 specifies the reliability parameters (e.g., requirements/goals) of customer 102 both as a function of time and as a function of the requirements of the application or service of the customer 102. It will be appreciated that not every application/service in a customer suite is expected to have the same reliability needs and, further, that the reliability needs of an application/service may vary with time. An exemplary DRP 105, illustrating its time-varying nature, is depicted and described with respect to FIG. 2.

Figure 2:
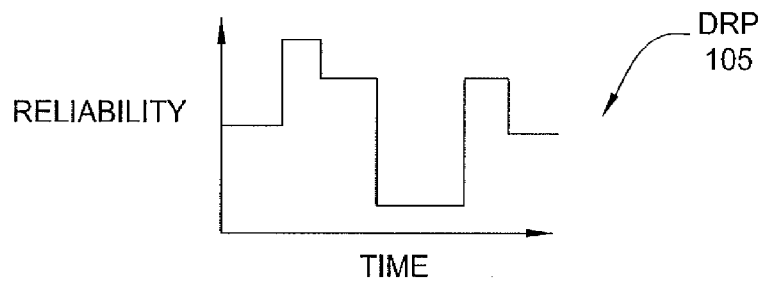
FIG. 2 depicts an exemplary dynamic reliability profile (DRP) for use by the RSG of FIG. 1.

FIG. 2 depicts an exemplary dynamic reliability profile (DRP) for use by the RSG of FIG. 1. As depicted in FIG. 2, DRP 105 represents the changes in the reliability needs of the customer (illustrated on the y-axis) over time (illustrated on the x-axis). As described herein, RSG 120 is configured to use the DRP 105 to dynamically configure the cloud resources 110 to provide the required reliability as specified in the DRP 105. It is noted that, in a cloud system with virtually infinite cloud resources, this results in higher utilization of resources, cost savings, efficiency of power usage, and various other advantages.

As described herein, the cloud system 100 may support multiple customers 102, each having one or more associated DRPs 105. As a result, cloud system 100 needs to manage the DRPs 105 of multiple customers 102 concurrently while accounting for the fact that DRPs 105 are time-varying profiles. With respect to the time-varying nature of DRPs 105 of multiple customers 102, the following three cases are considered herein (although it is noted that various other cases also may be considered): (1) the requirements of an application mix for a given customer may change with time, (2) the requirements for a set of customers may change with time, and (3) the requirements for a given application may change with time. An example of three customers 102 having different application mixes is depicted and described with respect to FIG. 3.

Figure 3:
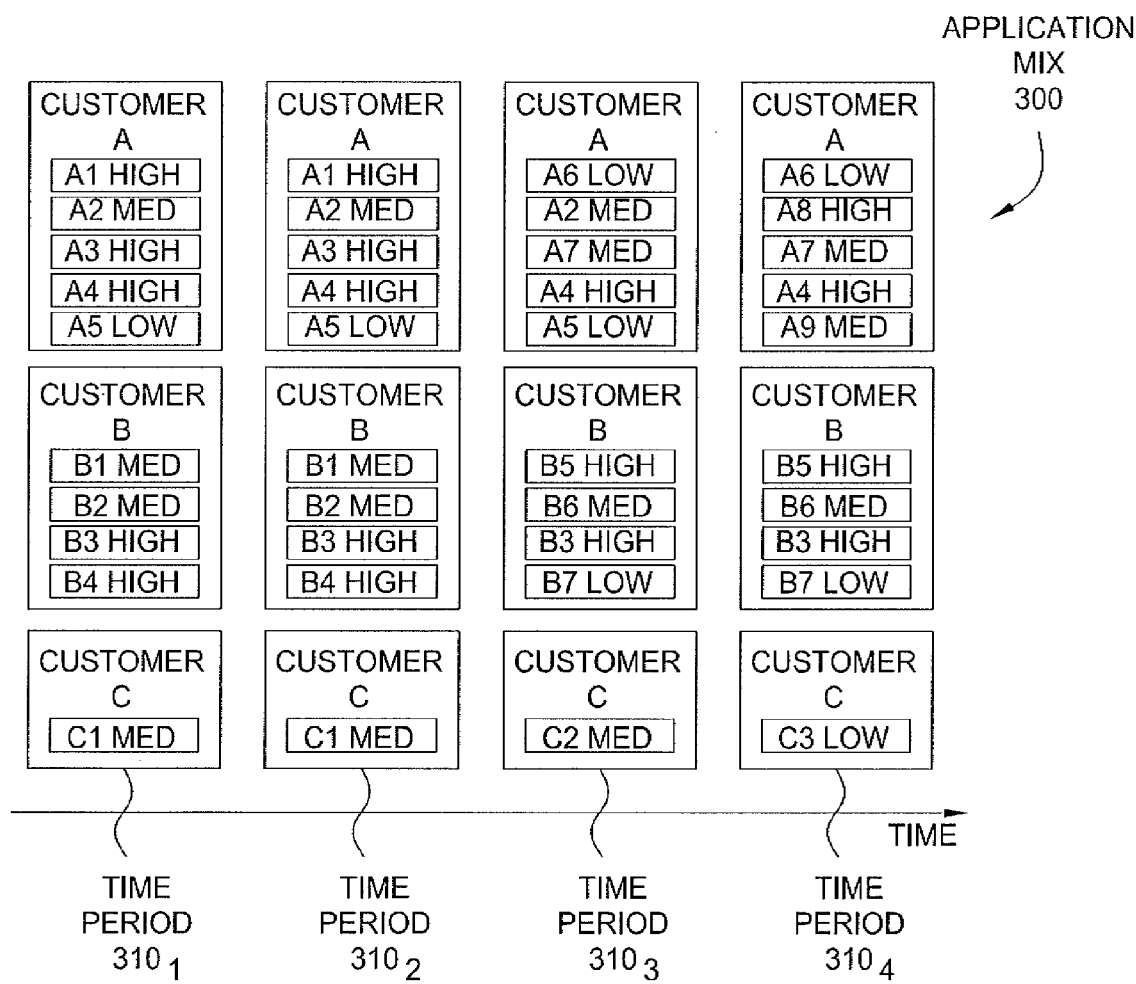
FIG. 3 depicts an exemplary application mix as a function of time for three customers of the cloud system of FIG. 1.

FIG. 3 depicts an exemplary application mix as a function of time for three customers of the cloud system of FIG. 1.

As depicted in FIG. 3, application mix 300 illustrates an exemplary mix of applications of three customers denoted as customers A, B, and C. The applications of the three customers A, B, and C are denoted as $A_i$, $B_i$, and $C_i$, respectively. The applications $A_i$, $B_i$, and $C_i$ each have a reliability requirement associated therewith (where, for purposes of clarity, three possible reliability requirements are supported as follows: high (HIGH), medium (MED), and low (LOW)). In this example, a reliability requirement of HIGH indicates that full active/active redundancy is expected, a reliability requirement of MEDIUM indicates that a redundancy scheme of active/standby is expected, and a reliability requirement of LOW indicates that no redundancy is expected.

The application mix 300 changes over time, and four exemplary time periods $310_1$-$310_4$ (collectively, time periods 310) are depicted for use in illustrating changes of the application mix 300 over time.

In time period $310_1$, customer A has applications A1 to A5, where applications A1, A3, and A4 each have a reliability requirement of HIGH, application A2 has a reliability requirement of MEDIUM, and application A4 has a reliability requirement of LOW. Also in time period $310_1$, customer B has applications B1 to B4, where applications B1 and B2 each have a reliability requirement of MEDIUM and applications B3 and B4 each have a reliability requirement of HIGH. Also in time period $310_1$, customer C has an application C1 which has a reliability requirement of MEDIUM.

In time period $310_2$, the mix of applications for customers A, B, and C is identical to the application mix 300 of time period $310_1$ (i.e., nothing has changed).

In time period $310_3$, the mix of applications for customers A, B, and C has changed in a number of ways (e.g., previous applications are no longer present, reliability requirements of previous applications that are still present have changed, new applications have been introduced, and the like). In time period $310_3$, customer A has applications A2, A4, A5, A6 (new), and A7 (new), where applications A2 and A7 each have a reliability requirement of MEDIUM, application A4 has a reliability requirement of HIGH, and applications A5 and A6 each have a reliability requirement of LOW. Also in time period $310_3$, customer B has applications B3, B5, B6, and B7, where applications B3 and B5 each have a reliability requirement of MEDIUM, application B6 has a reliability requirement of MEDIUM, and application B7 has a reliability requirement of LOW. Also in time period $310_3$, customer C has an application C2 (new) which has a reliability requirement of MEDIUM.

In time period $310_4$, the mix of applications for customers A, B, and C has again changed in a number of ways (e.g., previous applications are no longer present, reliability requirements of previous application that are still present have changed, new applications have been introduced, and the like).

It is noted that the reliability requirements depicted and described with respect to FIG. 3 are merely exemplary. In reality, the granularity may be finer, and the complexity of the applications and their associated reliability requirements may be different. For example, one or more of the exemplary reliability requirements may be represented using other values, one or more of the exemplary reliability requirements may be defined in other ways, fewer or more reliability requirements (including different reliability requirements) may be supported, various reliability goals may be supported (e.g., in place of and/or in addition to the reliability requirements), and the like, as well as various combinations thereof).

Figure 4:
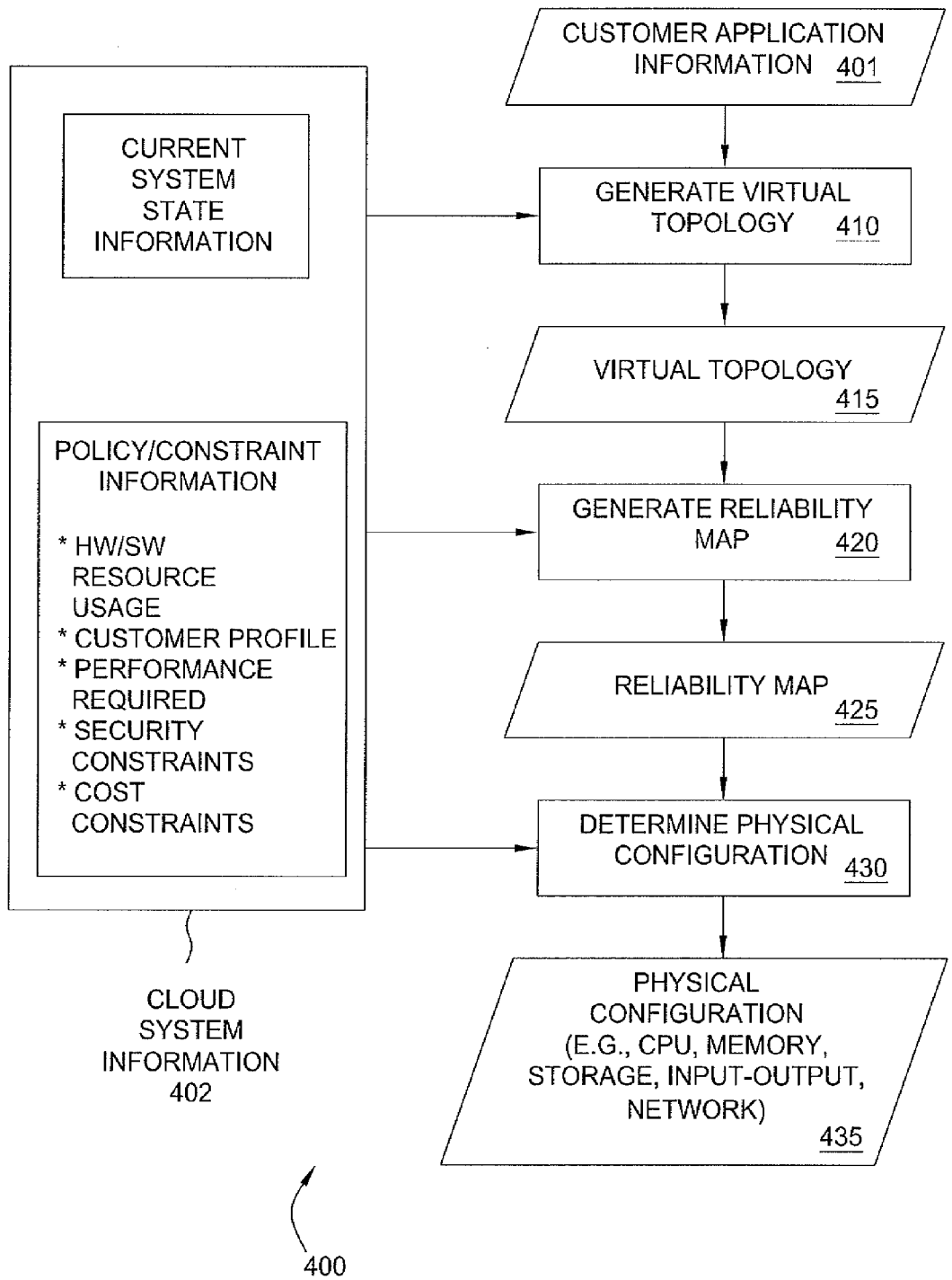
FIG. 4 depicts one embodiment of a process for mapping customer application information onto physical resources of the cloud system of FIG. 1.

FIG. 4 depicts one embodiment of a process for mapping customer application information onto physical resources of the cloud system of FIG. 1.

In general, process 400 performs a constrained mapping of what is needed and/or desired by the customer 102 to what is realizable within the underlying cloud infrastructure (i.e., it is as if the customer 102 can dial-a-reliability and the cloud system 100 attempts to deliver it).

In one embodiment, method 400 is executed by the CE 122 of the RSG 120.

As depicted in FIG. 4, input information is received and used at certain points in method 400. The input information includes customer application information 401 and cloud system information 402. The customer application information 401 includes customer application topology information of the customer 102 (e.g., which may be specified explicitly and/or extracted from a description), customer SLA information of the customer 102, the DRP 105 of the customer 102, and the like. The cloud system information 402 includes current system state information, policy/constraint information (e.g., one or more of hardware and/or software resource usage information, customer profile information, required performance information, security constraints, cost constraints, and so forth), and the like.

At step 410, a virtual application topology 415 is generated using at least a portion of customer application information 401 and/or at least a portion of cloud system information 402. In one embodiment, for example, the virtual application topology 415 may be generated using the application topology information, the current system state information, and the policy constraints.

At step 420, a reliability map 425 is generated using the virtual application topology 415 and at least a portion of cloud system information 402 (and, optionally, although omitted for purposes of clarity, at least a portion of customer application information 401). The reliability map 425 identifies a reliability configuration expected to satisfy the application needs and/or goals of the customer 102. In one embodiment, the reliability map 425 may be expressed as a Reliability Block Diagram (RBD). It is noted that there are many considerations associated with generation of reliability map 425. For example, the redundancy architecture and failover schemes are impacted by the location of the processor resources (e.g., whether the processor resources are within the same mutli-core chip, on the same blade, across blades, across chassis, within a LAN, across a WAN, and the like). For example, the allocation of memory and disk also may be considered. For example, the disk allocation, file system and database configuration, whether local or remote, also may be considered. Additionally, the generation of reliability map 425 may be further complicated, because fault tolerance requirements (e.g., as specified in the DRP 105) may only be part of the problem (e.g., performance, security, cost, and the like are other elements which may need to be considered, along with the DRP 105, in determining the optimal configuration).

At step 430, a physical configuration 435 is determined using the reliability map 425 and at least a portion of cloud system information 402 (and, optionally, although omitted for purposes of clarity, at least a portion of customer application information 401). In one embodiment, for example, physical configuration 435 may be determined using reliability map 425, the current system state information, and the policy/constraint information. The physical configuration 435 specifies a mapping of the reliability map 425 of the customer 102 onto the available physical infrastructure 101 of cloud system 100 (e.g., onto cloud resources 110). For example, physical configuration 435 specifies a mapping of the reliability map 425 of the customer 102 onto one or more of processors, memory units, disks, files, databases, input-output resource, network resources, and the like.

Figure 5:
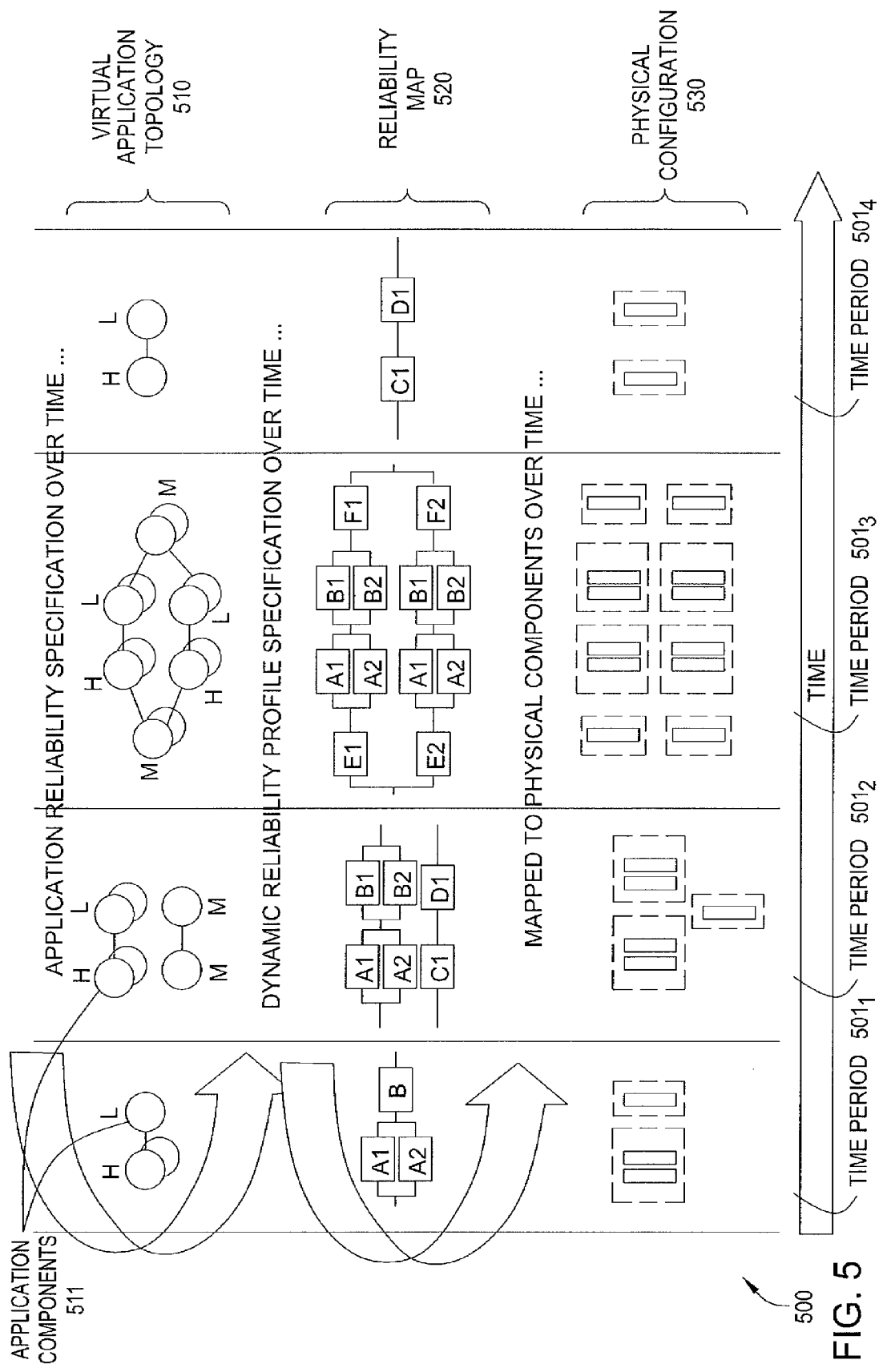
FIG. 5 depicts an exemplary mapping of an application topology to physical infrastructure.

FIG. 5 depicts an exemplary mapping of an application topology to physical infrastructure.

The exemplary mapping 500 of FIG. 5 corresponds to steps depicted and described with respect to method 400 of FIG. 4. The exemplary mapping 500 of FIG. 5 illustrates an application topology 510 (e.g., providing an application reliability specification over time), a reliability map 520 (e.g., providing a DRP specification over time), and a physical configuration 530 (e.g., specifying a mapping to physical components over time), which correspond to virtual application topology 415, reliability map 425, and physical configuration 435 of FIG. 4, respectively.

As depicted in FIG. 5, the exemplary mapping 500 is for an application whose reliability needs vary with time. The application changes over time, and four exemplary time periods $501_1$-$501_4$ (collectively, time periods 501) are depicted for use in illustrating changes of the application over time.

The application topology 510 illustrates application components 511 within the application and associated reliability requirements of the application components 511 (illustratively, using H, M, and L to denote high, medium, low reliability requirements, respectively). In time period $501_1$, the application includes two application components including a first application component having a HIGH reliability requirement and a second application component having a LOW reliability requirement. In the other time periods 501, the application topology 510 changes as the application changes.

The reliability map 520 is expressed in the form of an RBD. In time period $501_1$, the application maps into two components A and B, where component A is a redundant pair A1 and A2 (due to its HIGH reliability requirement). The component B is cascaded with component A and is simplex in operation (due to its LOW reliability requirement). In the other time periods 501, the reliability map 520, expressed in the RBD, changes as the application topology 510 changes.

The physical configuration 530 specifies a mapping of the reliability map 520 of the application (illustratively, the application components of the RBD of the application) onto the available physical infrastructure of the cloud system. For example, physical configuration 530 may specify a mapping of the reliability map 520 onto one or more of processors, memory units, disks, files, databases, input-output resource, network links, and the like. In time period $501_1$, the application component A including redundant pair A1 and A2 maps to two processor resources configured to provide such redundancy and the application component B maps to a processor resource. In the other time periods 501, the physical configuration 530 changes as the reliability map 520, expressed in the RBD, changes. Although primarily depicted and described with respect to mapping onto processor resources, it is noted that the physical configuration 530 may specify mapping of the reliability map 520 of the application onto any suitable resources, e.g., more detailed mapping onto processor resources (e.g., processors with the appropriate privileges, read/write/execute permissions and access to files, databases, I/O and communication ports that are consistent with the security and user profile specifications, and the like), mapping onto other types of resources (e.g., memory units, disks, files, databases, input-output resource, network links, and the like), and the like, as well as various combinations thereof.

Returning again to FIG. 1, ME 126 is configured to perform monitoring and metering functions for cloud system 100. The ME 126 may cooperate with other components of RSG 120 to enable self-healing capabilities to be supported within cloud system 100.

The ME 126 may be configured to periodically scan the computing resources in cloud system 100 to identify faults, identify security attacks, measure the performance of the application, and the like, and, further, to report associated results (e.g., identification of faults, identification of security attacks, detection of performance degradation, and the like, as well as various combinations thereof).

The ME 126 may be configured to generate alerts when aberrations are detected, and related alerts are correlated and analyzed to determine the existence (or non-existence) of service affecting network conditions.

The ME 126 may be configured to collect alarms (e.g., from some or all of the network components of cloud system 100) and to correlate the collected alarms against the alert conditions based on temporal and/or spatial relativity.

The ME 126 may be configured to gather network topology information for the cloud system 100 and to incorporate the network topology information into one or more models for use in performing such correlation functions.

The ME 126 may be configured to determine the root cause of independent network events and, optionally, to mark detected network events as outage-related (service affecting) or non-outage-related (non-service affecting).

The ME 126 may be configured to calculate service availability for a specific aggregation level over a specific period of time by analyzing the set of independent root cause events to determine the set falling within the specified time period, combining the durations of the correlated events to calculate the total amount of outage time within the specified time period, comparing the events against the network topology information and the types of services affected by the events, and determining a total service availability for the service(s) being evaluated using the scope of network impact and the percentage of outage time. It is noted that determination of service availability may be dependent on the sub-network(s) considered, the underlying network technologies used, network topology/size, and like factors.

The ME 126 may be configured to determine a Reliability Integrity Meter and to determine control information for use by CE 128. An exemplary use of ME 126 to perform such functions is depicted and described with respect to FIG. 6.

Figure 6:
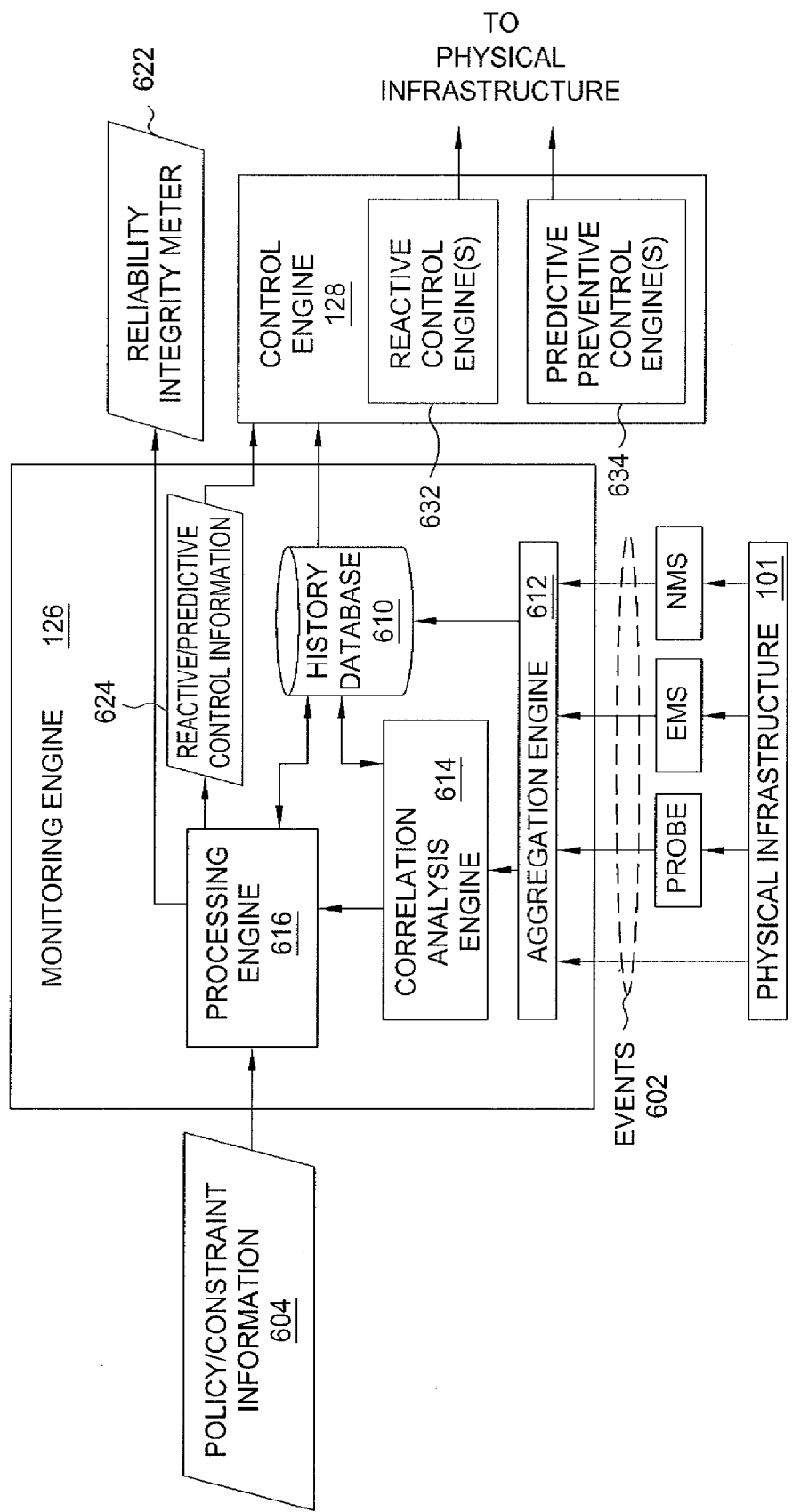
FIG. 6 depicts an exemplary use of the RSG of FIG. 1 to perform event correlation and determine reactive/predictive control information.

FIG. 6 depicts an exemplary use of the RSG of FIG. 1 to perform event correlation/aggregation and determine reactive/predictive control information.

As depicted in FIG. 6, the ME 126 is configured to perform event correlation/aggregation and determine reactive/predictive control information.

The ME 126 receives events 602 and policy/constraint information 604. The events 602, as depicted in FIG. 6, may be received directly from the physical infrastructure 101 of cloud system 100 and/or may be received from other one or more monitoring and/or management elements/systems (e.g., one or more probes, one or more Element Management Systems (EMSs), one or more Network Management Systems (NMSs), and the like) on behalf of the physical infrastructure 101 of cloud system 100. The monitoring for the events 602 may be performed by ME 126 and/or across the physical infrastructure 101 of cloud system 100 (e.g., for reporting to ME 126). The types of events 602 for which monitoring is performed may include software alerts generated by sub-systems, threshold crossings that occur in the measurement counters for various metrics, application failures (e.g., total and/or partial), security attacks that result in service being impacted, hardware failures (e.g., recoverable or not), variations in the traffic load, network failures, and the like. The policy/constraint information 604, as depicted in FIG. 4, may include one or more of hardware and/or software resource usage information, customer profile information, required performance information, security constraints, cost constraints, and the like, as well as various combinations thereof.

The ME 126 includes an aggregation engine 612, a correlation analysis engine 614, and a processing engine 616. The ME 126 also includes a history database 619.

The aggregation engine 612 receives the events 602 associated with physical infrastructure 101 and aggregates the events 602. The aggregation engine 612, when performing processing for a specific period of time, may aggregate the events 602 by analyzing the events 602 to determine the set falling within the specified time period. The aggregation engine 612 may provide the aggregated event information to correlation analysis engine 614 and/or to history database 619.

The correlation analysis engine 614 receives the aggregated event information (e.g., from aggregation engine 612 and/or from history database 619) and performs correlation of the aggregated events. The correlation analysis engine 614 may perform any suitable correlation functions. For example, related events 602 may be correlated and analyzed to determine the existence (or non-existence) of service affecting network conditions, events 602 may be correlated against the alert conditions based on temporal and/or spatial relativity, and the like, as well as various combinations thereof. The correlation analysis engine 614 may provide the correlated event information to processing engine 616 and/or to history database 619.

The processing engine 616 receives the policy/constraint information 604 and receives the correlated event information (e.g., from correlation analysis engine 614 and/or from history database 619).

The processing engine 616 generates a Reliability Integrity Meter (RIM) 622 which may include a summary of the information that is monitored, aggregated, and correlated by ME 126. The processing engine 616 may store RIM 622 locally (e.g., in history DB 619) and/or may provide RIM 622 to any suitable system, device, engine, and/or other component or element.

The processing engine 616 generates reactive/predictive control information 624. The ME 126 provides the reactive/predictive control information 624 to CE 128 for use by CE 128 in performing control functions within the physical infrastructure 101 of cloud system 100. For example, ME 126 provides (1) reactive control information to CE 128 for use by one or more reactive control engines of CE 128 to provide reactive control functions within the physical infrastructure 101 of cloud system 100 and (2) predictive prevention control information to CE 128 for use by one or more predictive preventive control engines of CE 128 to provide predictive preventative control functions within the physical infrastructure 101 of cloud system 100.

The processing engine 616 may be configured to calculate various types of performance metrics (e.g., key quality indicators (KQIs), key performance indicators (KPIs), and the like), from raw data collected by ME 126. The metrics may be calculated for inclusion in the RIM 622. For example, performance metrics that may be used for reliability metering may include one or more of failure frequency (e.g., at the service level, component level, or any other suitable level) for hardware and/or software, downtime (e.g., at the service level, component level, or any other suitable level) for hardware and/or software, availability (e.g., at the service level, component level, or any other suitable level) for hardware and/or software, data unavailability (e.g., due to failures, security attacks, and the like), and the like, as well as various combinations thereof. It is noted that metrics may be specified at any suitable level (e.g., for a virtualized application or component, for a set of virtualized applications or components, for a service, for a set of services, for an end-to-end solution, for a datacenter, and the like, as well as various combinations thereof). It is noted that the performance indicators may be those that are most relevant to the customer 102 under consideration. The processing engine 616 also may be configured to compare the performance indicators with expected values.

As further depicted in FIG. 6, CE 128 is configured to receive the reactive/predictive control information 624 from ME 126 and to use the reactive/predictive control information 624 to perform reactive/predictive control functions within the physical infrastructure 101 of the cloud system 100. The CE 128 may provide the reactive control functions and the predictive preventative control functions by providing associated feedback actions into the physical infrastructure 101 (e.g., feedback actions 137 depicted and described with respect to FIG. 1). It is noted that, whereas the ME 126 observes and measures the behavior of the cloud system 100, the CE 128 closes the loop to ensure that the measured behavior matches the expected behavior and, further, that, if there is a deviation, then appropriate corrective action is initiated. It is further noted that ME 126 performs functions and produces results that ultimately drive the control actions performed by CE 128 (e.g., the ME 126 combines the results of correlation analysis engine 614 with the policy/constraint information 604 and produces metrics included within the RIM 622, saves the results and current state as historical information within history database 619, and uses the policy/constraint information 604 and the historical information to drive the reactive and predictive preventative control actions performed by CE 128).

The CE 128 includes a reactive control engine 632 and a predictive preventative control engine 634.

The reactive control engine 632 receives reactive control information from ME 126 and performs reactive control functions within the physical infrastructure 101. The reactive control engine 632 may be configured to respond with an action to recover from a condition (e.g., an event, a failure, and the like). For example, recovery actions may include performing a process restart, performing a processor reboot and process restart on another processor (e.g., local or remote), reestablishing a failed network connection, performing a restart on a storage unit, performing recovery actions related to soft failures (e.g., re-initialization of data, restoration or resetting of a process, and the like), and the like, as well as various combinations thereof. The reactive control engine 632 may be configured to run a diagnostic test in order to identify the source or root cause of a condition.

The predictive preventative control engine 634 receives predictive preventative control information from ME 126 and performs predictive preventative control functions within the physical infrastructure 101. The predictive preventative control engine 634 may be configured to perform predictive preventative measures such as performing reorganizations, performing rebalancing actions, performing audits, performing proactive testing, and the like.

For example, predictive preventative control engine 634 may be configured to reorganize resources (e.g., a dynamic model construction as new services are composed or due to the recent events occurring in the system, a re-composition that changes the structure of the existing composite service, and the like).

For example, predictive preventative control engine 634 may be configured to perform defragmentation (e.g., by periodically defragmenting a storage system to make the disk accesses smoother and more efficient, thereby improving performance and conserving disk life time).

For example, predictive preventative control engine 634 may be configured to perform dynamic reliability modeling in which dynamic reliability computations are based on incremental updating of failure data. In one embodiment, the focus of dynamic reliability modeling is on the entire process from runtime data collection to reliability evaluation, with an emphasis on data collection and dynamic profiling instead of only using historical data. In one embodiment, the RIM 622 may be dynamically updated as the software is re-composed to meet the changing environment of cloud system 100.

For example, predictive preventative control engine 634 may be configured to perform re-balancing operations (e.g., by re-balancing the load on the available resources subject to the policy/constraint information 604).

For example, predictive preventative control engine 634 may be configured to perform audits. In one embodiment, periodic audits are performed to track physical and logical resources, maintain data integrity, and ensure security. In one embodiment, an audit may be performed on (1) resource inventory (e.g., CPU, memory, I/O, and network resources) and (2) topology of the infrastructure (e.g., connectivity between components including the redundancy configurations). In one embodiment, an audit is performed on the user databases and files to ensure data integrity and uncover any potential problems.

For example, predictive preventative control engine 634 may be configured to perform proactive testing. In one embodiment, proactive testing may include performing in-service simulated attacks, brink-of-failure condition testing, and testing related to planned maintenance actions (e.g., unplugging). In one embodiment, at least a portion of such proactive testing may rely on availability of virtually infinite resources in the physical infrastructure 101. This type of testing may help to ensure that the cloud system 100 continues to be robust.

In this manner, RSG 120 is configured to enable cloud system 100 to function as a self-reliable system.

Although primarily depicted and described with respect to use of specific components (illustratively, CE 122, SE 124, ME 126, and CE 128) to provide specific functions of RSG 120, it is noted that the functions of RSG 120 may be provided using any suitable component or components. For example, functions depicted and described as being performed by the illustrated components, respectively, may be distributed across the illustrated components in a different manner. For example, one or more other components (e.g., in place of and/or in addition to the illustrated components) may be used to provide the functions depicted and described as being performed by the illustrated components.

Although primarily depicted and described with respect to a specific deployment of the RSG 120 within cloud system 100 (illustratively, using a specific distributed architecture), it will be appreciated that RSG 120 may be implemented within cloud system 100 using any other suitable deployment which may include centralized or decentralized deployment of various functions of RSG 120.

Thus, it will be appreciated that RSG 120 may be incorporated into the cloud system 100 in any suitable manner.

Figure 7:
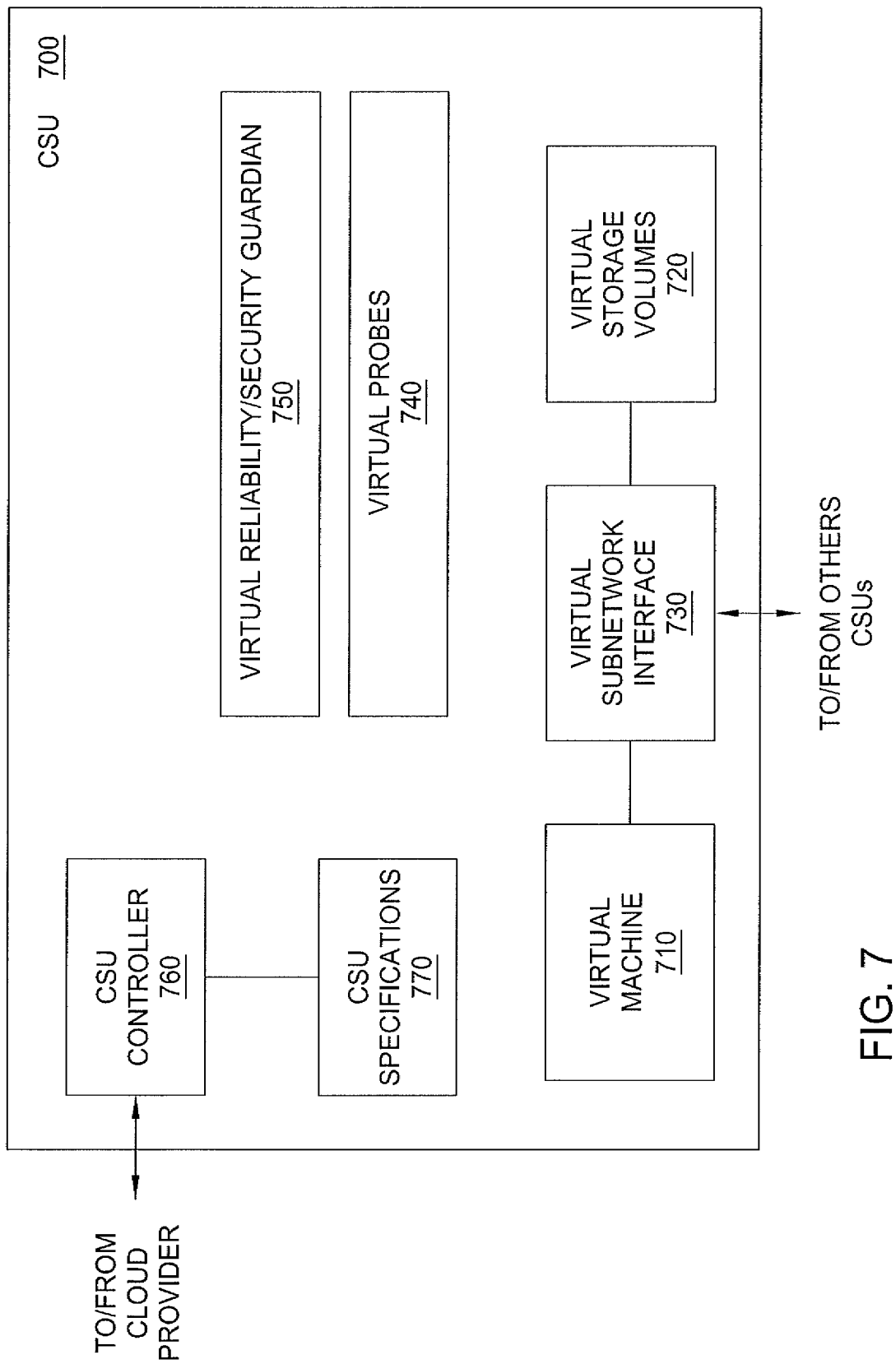
FIG. 7 depicts one embodiment of a self-reliable Compute Store Unit (CSU) suitable for use in implementing the RSG of FIG. 1.
Figure 8:
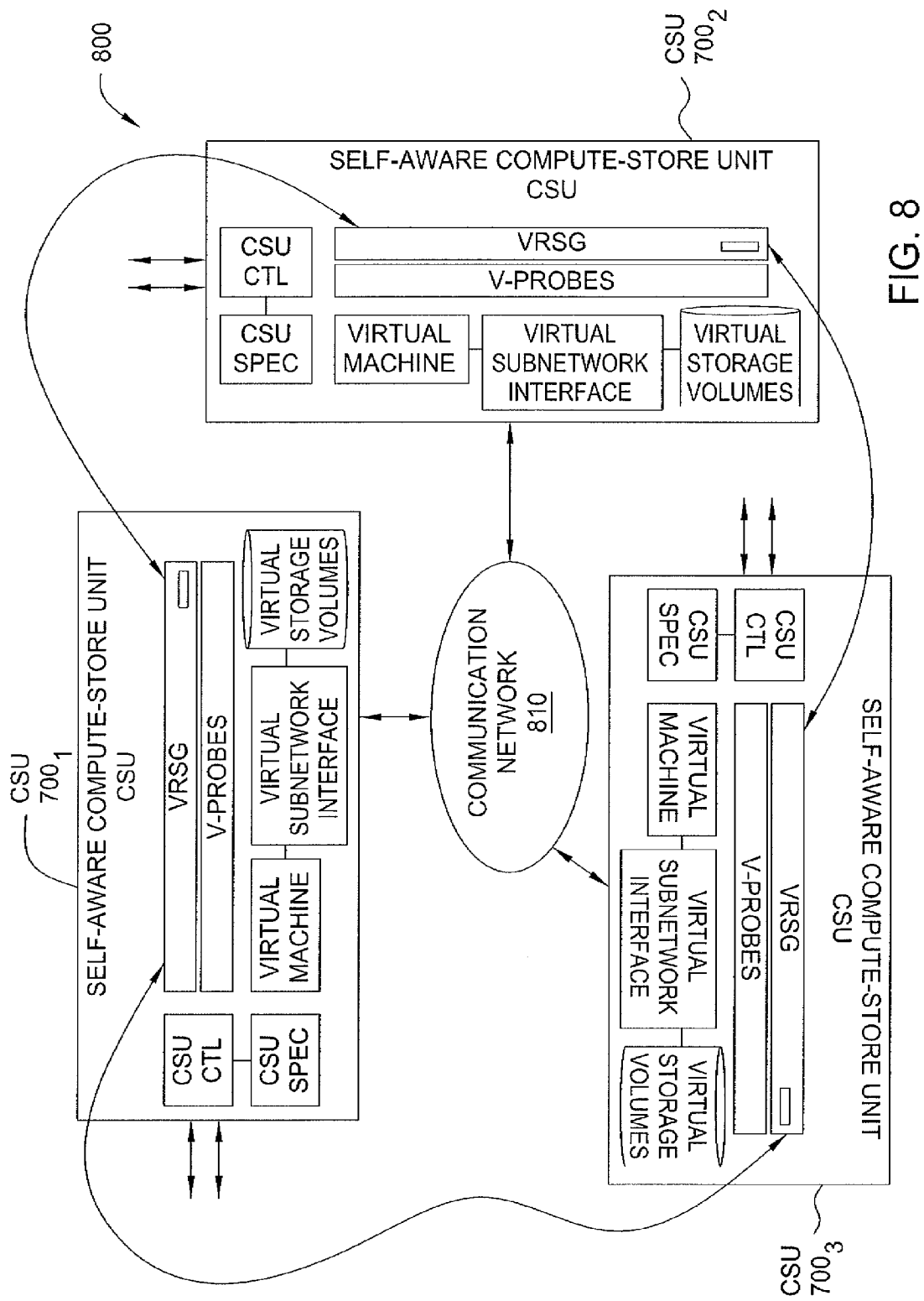
FIG. 8 depicts an exemplary deployment of multiple CSUs of FIG. 7 in a customer domain to form a distributed self-reliable cloud system.
Figure 9:
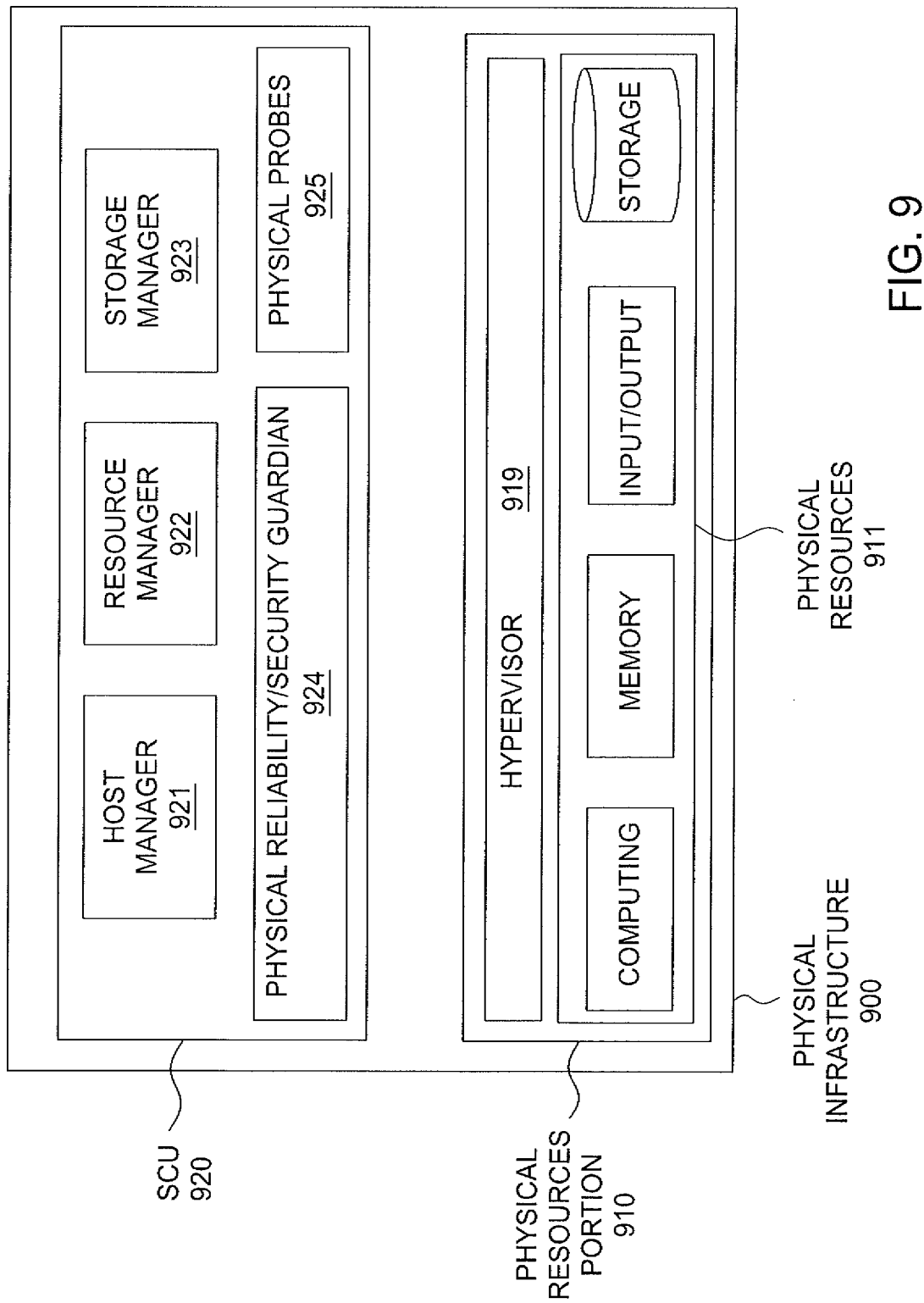
FIG. 9 depicts one embodiment of a System Control Unit (SCU), suitable for use in implementing the RSG of FIG. 1, deployed within a portion of the cloud system of FIG. 1.

In one embodiment, RSG 120 may be incorporated into the cloud system 100 using (1) a virtual layer composed of one or more Compute Store Units (CSUs), an exemplary embodiment of which is depicted and described with respect to FIGS. 7 and 8, and (2) a physical layer composed of one or more System Control Units (SCUs), an exemplary embodiment of which is depicted and described with respect to FIG. 9.

FIG. 7 depicts one embodiment of a self-reliable Compute Store Unit (CSU) suitable for use in implementing the RSG of FIG. 1.

The CSU 700 is an abstract basic building block of a distributed version of cloud system 100. The CSU 700 may be specified by the customer 102, which expects the CSU 700 to be secure and recoverable. The CSU 700 may be controlled based on various parameters (e.g., SLA 103, DRP 105, QoS parameters, and the like) which may be provisioned by the customer 102. The customer 102 also may provision related information (e.g., the topology of the distributed cloud system, governing policy rules for the distributed cloud system, and the like). It is noted that a customer domain may include one or more CSUs 700. In the case in which a customer domain includes multiple CSUs 700, the multiple CSUs 700 may communicate with each other to form a virtual, distributed computing machine. In one embodiment, the RSG 120 is embedded within each CSU 700 in order to ensure that each CSU 700 is, as indicated, self-reliable.

The CSU 700 includes a Virtual Machine (VM) 710, Virtual Storage Volumes (VSVs) 720, a Virtual Subnetwork Interface (VSI) 730, Virtual Probes (VPs) 740, a Virtual Reliability/Security Guardian (VRSG) 750, a CSU Controller (CC) 760, and CSU Specifications (CS) 770.

The VM 710 includes the processor and associated memory configured to provide the various functions of the CSU 700. It may be used as the basic compute engine configured for several levels of performance and reliability. The VSVs 720 provide storage for the CSU 700. The VSVs 720 may include one or more of a database(s), one or more files, one or more disks, one or more flash memory components, and the like, as well as various combinations thereof.

The VSIs 730 provide an interface to other CSUs 700 of the cloud system 100 (e.g., for sharing virtual memory associated with VMs 710, for sharing storage in the VSVs 720, and the like). The VSIs 730 may support secure connections in order to provide such sharing capabilities. An exemplary distributed self-reliable cloud system using multiple CSUs 700 communicating via multiple associated VSIs 730 is depicted and described with respect to FIG. 8.

The VPs 740 collect utilization, reliability, performance, and security data for the CSU 700.

The VRSG 750 is configured to operate as the RSG 120 for the CSU 700, performing the configuration, scheduling, monitoring, and control functions depicted and described with respect to FIGS. 1-6 as being performed by CE 122, SE 124, ME 126, and CE 128, respectively. The VRSG 750 also may be configured to monitor and manage components of CSU 700 (e.g., for monitoring and managing recovery of components within CSU 700, including performing recovery actions for recovering from failures within the CSU 700 in which the VRSG 750 is implemented and/or in other CSUs 700 having other VRSGs 750).

The CC 760 is configured to manage the operation of the CSU 700. The CC 760 may interact with the cloud provider. The CC 760 also may monitor the status of the virtual infrastructure via VRSG 750. The CC 760 is configured to communicate with SCUs.

The CS 770 maintains attributes associated with the CSU 700 (e.g., CPU requirements, memory requirements, storage volume attachments for VSVs 720, connections to other CSUs 700 via VSIs 730, reliability level, recovery scheme, behaviors in event of conditions such as failures, scalability policy attributes, QoS attributes, security constraints, performance constraints, and the like, as well as various combinations thereof). It is noted that there may be security between elements within the CSU 700 and, similarly, there may be security between self-reliable CSUs 700 in the case of a distributed cloud system including multiple self-reliable CSUs 700. The CS 770 may support changes to attributes through provisioning.

As described herein, a customer domain may include any suitable number of CSUs 700. In one embodiment, in which a customer domain includes multiple CSUs 700, the multiple CSUs 700 may communicate with each other to form a distributed self-reliable cloud system that is configured to operate as a virtual, distributed computing machine. In one such embodiment, VRSGs 750 of multiple CSUs 700 may communicate with each other via the VSIs 730 of the multiple CSUs 700 to form a distributed self-reliable cloud system. An example is depicted and described with respect to FIG. 8.

FIG. 8 depicts an exemplary deployment of multiple CSUs of FIG. 7 in a customer domain to form a distributed self-reliable cloud system.

As depicted in FIG. 8, the customer domain 800 includes three CSUs $700_1$-$700_3$, where each CSU 700 is implemented as depicted and described with respect to CSU 700 of FIG. 7.

The three CSUs 700 are configured to communicate with each other via a communication network 810. More specifically, the VRSGs 750 of the CSUs 700 are configured to communicate with each other by accessing communication network 810 via the respective VSIs 730 of the CSUs 700. In one embodiment, when CSUs 700 are consolidated on physical servers and the associated networking needs of the platform intensify as a result, local communication could be virtualized (e.g., rather than forcing all of the communication between the CSUs 700 to the physical layer of the platform), where the virtualization may be implemented in any suitable manner (e.g., using one or more virtual switches which are configured to behave like physical switches but which are virtualized into the platform, or in any other suitable manner).

The three CSUs 700 may be configured to communicate with each other using the Reliable Adaptive Distributed Protocol (RADP). The RADP enables the three CSUs 700 to exchange various types of information (e.g., information related to one or more of reliability, security, performance, topology, event data, and the like, as well as various combinations thereof), thereby enabling the three CSUs 700 to coordinate actions.

It is noted that other communications-related capabilities may be supported. In one embodiment, for example, default network is limited to being exchanged between VMs 710 on the same subnet. In one embodiment, for example, VSVs 720 may only be visible for connections and imaging within the same CSU 700. In one embodiment, for example, sharing of information from VSVs 720 between CSUs 700 is limited to transport over secure paths.

In this manner, the cloud provider can use the reach and scale of the communication network 810 to efficiently distribute cloud services across the physical infrastructure 101.

As noted above, RSG 120 may be incorporated into the cloud system 100 using, in addition to a virtual layer composed of one or more CSUs 700, a physical layer that is composed of one or more SCUs.

FIG. 9 depicts one embodiment of a System Control Unit (SCU), suitable for use in implementing the RSG of FIG. 1, deployed within a portion of the cloud system of FIG. 1.

As depicted in FIG. 9, a simplified physical infrastructure 900 includes a physical resources portion 910 and an SCU 920.

The physical resources portion 910 includes physical resources 911 of the physical infrastructure 900 (which may be part of physical infrastructure 101 depicted and described with respect to FIG. 1) and a hypervisor 919.

The physical resources 911 may include computing resources, memory resources, input-output resources, storage resources, and the like, as well as various combinations thereof.

The hypervisor 919 is configured to provide management functions for physical resources 911. The hypervisor 919 is configured to support CPU virtualization, thereby enabling the CPU to be shared with multiple operating systems. The hypervisor 919 may provide various other functions.

The SCU 920 is configured to provide CSU management functions for managing CSUs of a customer domain (e.g., one of more of the CSUs 700 of FIG. 7). The SCU 920 is configured to communicate with the CC(s) 760 of the CSUs 700 of the customer domain. The SCU 920 is configured to perform CSU management functions, which may include functions such as creating/managing/deleting virtual components, managing connectivity policies defined for intra-CSU and inter-CSU interaction, and the like, as well as various combinations thereof.

The SCU 920 includes a host manager (HM) 921, a resource manager (RM) 922, a storage manager (SM) 923, a Physical Reliability/Security Guardian (PRSG) 924, and Physical Probes (PPs) 925.

The HM 921 runs on a physical host within the privileged virtual machine (e.g., host OS), and manages and validates the actions that occur on the physical host. The HM 921 enforces the isolation of the CSUs 700 from each other and from the SCU 920 by mediating access to the various resources (e.g., compute, storage, network, and the like) of the physical host.

The HM 921 translates abstract virtual models into configuration data appropriate to the underlying hypervisor 919 of the physical host. The HM 921 interacts with SM 923 to create and remove virtual block devices as required by the hosted virtual machine. The CSUs 700 may be implemented as virtual overlay networks on a single shared physical network, without need for any special hardware. The network layer provides resource control to limit and prioritize virtual machine bandwidth consumption.

The SCU 920 and hypervisor 919 may cooperate to perform mapping of the virtual application topology to the physical infrastructure of the cloud system (e.g., as depicted and described herein with respect to FIG. 4 and FIG. 5). The customer 102 specifies the desired topology of the virtual machines, the virtual storage blocks, and the virtual network, where the specified topology is expected to satisfy a set of defined constraints. The constraints include permitted communication patterns, virtual machine co-location constraints, QoS constraints, and the like, as well as various combinations thereof. The topology and constraint description may be changed dynamically in response to various conditions (e.g., load conditions, failure conditions, and the like). The CSU(s) 700 of the customer domain may then automatically adapt to meet the changing requirements. It is noted that, on the storage side, there is a scalable, persistent, and encrypted store that allows the service to maintain data throughput even under load conditions.

The self-reliable architecture depicted and described with respect to FIGS. 1-9 may utilize and/or provide various other capabilities and/or technologies, at least some of which may have a bearing on service reliability within the self-reliable architecture.

A first capability relates to failure modes and recovery within the context of the self-reliable architecture.

In many cases, self reliable systems are about redundancy and fault-tolerance. Since no single component can guarantee 100% uptime, the architecture allows individual components to fail without affecting the availability of the entire system. Self-reliable operation expects that many, if not all, of the systems in the distributed system tolerate failure from other systems on which it depends.

In one embodiment, RSG 120, at the virtual level and at the physical level, is responsible for detecting, containing, and recovering from various types of failures. In one such embodiment, fault containment may assume significant importance due to the shared nature of the physical infrastructure 101 of cloud system 100.

In one embodiment, the following failure types and associated recovery modes may be supported: (1) process failures (e.g.: local process reset/restart; process restart on another CPU; process restart on another co-located blade, shelf, container, and/or CPU; process restart on remote CPU; others), (2) application failures (e.g.: local restart; another: CPU, Blade, Shelf, Container; multiple processes all over the servers, remote; others), (3) processor/CPU failures (e.g.: failure of CPU, blade, shelf, container, site; others), and (4) network failures (e.g.: failure of link, node, and the like; periodic audit of network paths; others).

In one embodiment, upon detection of a fault, the physical unit is immediately "quarantined." The security boundary is frozen. The recovery may be guided by the DRP 105, the system state information associated with cloud system 100, and/or the policy/constraint information associated with cloud system 100. The recovery strategy could be pre-established or it could be decided upon by the RSG 120. In one embodiment, in which the recovery strategy is decided upon by the RSG 120, the RSG 120 may decide the recovery strategy based on one or more factors (e.g., level of reliability, cost, performance, security considerations, and the like). For example, in the case of recovery from a process failure, RSG 120 may decide to restart the process locally, restart the process on another processor on the same blade, restart the process on a different blade in the same chassis, restart the process on a blade in another shelf, or restart the process on a blade in a remote shelf. The RSG 120 may make other determinations for other types of failure conditions and associated recovery modes.

A second capability relates to proactive testing within the context of the self-reliable architecture.

In one embodiment, the objective of proactive testing is to perform in-service resiliency and robustness tests periodically to ensure the readiness of the system to actually survive failures. For example, proactive testing may include simulating various conditions to verify the ability of the cloud system 100 to continue to operate under the simulated conditions. For example, proactive testing may include simulation of brink-of-failure conditions to verify the ability of the cloud system 100 to succeed during high stress conditions.

In one embodiment, RSG 120 periodically executes tests that randomly disable production instances to make sure that the cloud system 100 can survive this common type of failure without any customer impact. In one embodiment, RSG 120 performs proactive diagnostics in order to uncover silent failures. In one embodiment, the "infinite resource" feature of the cloud system 100 enables RSG 120 to conduct active, standby recovery scenarios on a much larger scale. In at least some such embodiments, the tests may be designed to cover any suitable components (e.g., CPU, memory, storage, I/O, network, and the like, as well as various combinations thereof).

In one embodiment, RSG 120 may support one or more in-service tests adapted for evaluating the reliability and security of the cloud system 100. For example, RSG 120 may be configured to perform in-service configuration tests such as: (1) using multiple versions of the network driver, tweaking the OS and driver level network settings, and getting Kernel hot fixes and applying them in service, (2) switching virtualization providers and changing TCP/IP host models, and (3) checking for configuration and run time problems in multiple geographic locations. For example, RSG 120 may be configured to perform in-service breakage and failover tests such as: (1) randomly enabling, disabling, disconnecting, and reconnecting processors, memory, disks, network ports, and like resources in order to simulate failures and/or maintenance actions and trigger recovery actions, (2) performing failover tests for processors and databases, ensuring that there are multiple redundant copies of data across CSUs 700, and checking N+1 redundancy, and (3) conducting security attacks on a periodic or constant basis. For example, RSG 120 may be configured to perform in-service load and capacity tests such as verifying the ability of the cloud system 100 to cope with large spikes in load caused by unusual activity and verifying the ability of the cloud system 100 to cope with the ripple effects of transient failures. For example, RSG 120 may be configured to perform in-service delay and timeout tests such as (1) checking timeouts, setting aggressive timeouts, checking fallback, and verifying recovery times, (2) inducing artificial delays in client-server communication layer to simulate service degradation and measure upstream service response and check dependency failures. For example, RSG 120 may be configured to perform in-service audit and health check tests such as (1) running health checks on each instance, monitoring external signs of health (e.g., CPU load) to detect unhealthy instances, performing tests on-line (e.g., using bad inputs, out of order entries, and like conditions) to uncover transactional failures, (2) executing test to find sub-system instances that do not adhere to best-practices, (3) searching for unused resources and ensuring that they are returned to the pool of available resources, and (4) running tests to find security violations or vulnerabilities.

A third capability relates to data integrity/security and confidentiality of data within the context of the self-reliable architecture. In general, customer 102 is vulnerable to data loss due to reliability problems. In one embodiment, using the RSG 120, each of the CSU(s) 700 protects (1) customers from each other, (2) infrastructure from the customers, and (3) customers from provider malfeasance. It is noted that security failures can arise for one or more of the following reasons: not all resources are virtualized, virtualization software is not bug free, situations in which code has broken loose, incorrect network virtualization which allows a customer to access sensitive portions of cloud provider infrastructure or resources of other customers.

A fourth capability relates to data availability/unavailability within the context of the self-reliable architecture.

In many cases, software applications and data are quite important to business such that, when the software applications and/or data are not available (e.g., due to outage conditions), the business is slowed or potentially even stopped until availability is restored. In the short term, such outage conditions result in data loss, employee and customer frustration, and lost revenue. In the long term, such outage conditions can affect a business over the life of the business (and lost records, transactions, and/or accounting files can even put a business at risk of regulatory violations). It will be appreciated that data may become unavailable for many reasons, which may be expressed using a state diagram that summarizes transitions from a normal state in which data is fully accessible (denoted as a NORMAL state) to abnormal states in which data is partially available or unavailable. For example, such abnormal states may arise when a system is hacked due to a security attack (denoted as a HACKED state), becomes corrupted due to an operator error or a program flaw (denoted as a CORRUPT/COMPROMISED state), becomes unavailable due to a lost encryption key (denoted as a CORRUPT/COMPROMISED state), or undergoes a planned maintenance action (denoted as a MAINTENANCE state).

In one embodiment, RSG 120 is configured to guard customer data to ensure that its availability is not compromised. The RSG 120 may guard customer data through one or more of audits, in-service tests, and data repair, and the like, as well as various combinations thereof. It is noted that data back-up and storage schemes are often a major component of disaster recovery plans. In one embodiment, customer data can be easily and automatically moved as needed. In one embodiment, customer data can be restored through storage of multiple copies of the customer data at multiple locations, where the data is kept in sync. In one embodiment, data restoration strategies can be specified for specific types of conditions (e.g., in the event of file or database or disk failures, one or more of the following data restoration strategies may be used: (1) cold backup schemes where a file snapshot is taken, and the file is saved and backed up; (2) warm backup schemes in which resources are reserved for customers; (3) hot backup schemes with replication of data managed by synchronized resources at remote sites (e.g., a duplicate, alternative failover site immediately takes over in the event of an outage).

A fifth capability relates to error and alarm handling within the context of the self-reliable architecture.

In one embodiment, RSG 120 is configured to perform active monitoring for early detection of abnormal behavior on the CSUs 700 and the SCUs 920 before customer service is impacted.

In one embodiment, VRSG 750 is configured to analyze problems and determine associated preventative control actions. In one such embodiment, VRSG 750 is configured to perform such functions in response to receiving alerts that result when a component of a CSU 700 detects an abnormal event and recovers.

In one embodiment, VRSG 750 is configured to process various types of input information in order to provide various control functions (e.g., control, filtering, analysis of faults, and the like, as well as various combinations thereof).

The VRSG 750 may process information relative to each CSU 700 in order to provide various control functions. The cloud system 100 is configured to generate abnormal events (e.g., alerts, alarms, and the like), during the course of its operation, at any or all levels (e.g., at one or more of the physical SCU level, the virtual CSU level, the network level, the service level, and the like). The cloud system 100 also is configured to collect various types of performance data. The values for the event variables being monitored may be subjected to a threshold to determine if an abnormal condition has been reached. In at least some cases, filtering criteria is applied and the variables that meet the criteria are recorded (e.g., in a log file). It will be appreciated that there are a finite number of event variables that are recorded for every time interval. The event variables capture the behavior of the associated component and provide additional context for event processing. For example, event variables may include: Function Errors Escalated, Traps/Exceptions Recovered, CPU Utilization Overall, Memory Utilization Overall, Transactions Aborted, Process Restarts, Errored TPDUs Sent, Errored TPDUs Received, Transport Timeouts Occurred, Number of Sanity Timeouts, Blade Restarts, Number of Failovers, Disk Access Failures, File Access Failures, Disk Usage, and Number of Critical Alarms. As noted above, VRSG 750 is configured to process this information relative to each CSU 700 in order to provide various control functions.

The VRSG 750 may receive and process information from several sources (e.g., autonomous reports of failures from components of the CSU 750, trouble reports from customers and peer VRSGs 750, results of diagnostics/exercises/audits from VRSGs 750, (4) impairment indications from a performance manager, network configuration data from a configuration manager, and the like, as well as various combinations thereof). The VRSG 750 is configured to integrate this information and provide functions such as control, filtering, analysis of faults, and the like. As a result of such processing by the VRSG 750, failed infrastructure resources are recognized, root causes of faults are identified, repair actions are arranged and scheduled, and the failed resources are returned to service.

The VRSG 750 and PRSG 924 may be configured to receive event notifications. The alert and alarm collection may include hardware and/or software events, at least some of which are handled within the local host based on the criteria specified by the CSUs 700 (for VRSGs 750) and SCUs 920 (for PRSGs 924). In one embodiment, event notifications are sent to the PRSG 750 and the VRSG 924 even if the condition was addressed. In this manner, history information may be maintained for signature analysis and determination of possible preventive actions. It is noted that, in case of software errors, only a relatively small number of such errors lead to unrecoverable exceptions as a majority of the errors are often resolved by the exception handler. It is further noted that at least some actions are performed by the host machine locally, in which case the PRSG 750 and the PRSG 924 may simply be informed of the action taken.

A sixth capability relates to reliable and scalable storage within the context of the self-reliable architecture. In many cases, in order to meet scale and cost goals, cloud systems are built from clusters of commodity servers, disks, and networks spread over multiple, geographically-distributed data centers. It is noted that a large number of failure scenarios are possible in such an environment (e.g., disk failures, network outages, power distribution outages and disasters, and the like). As a result, recovery from storage failures could be difficult for developers of cloud applications in cases when the semantics of the underlying storage system in certain cases are not known. For example, failure conditions leading to data inconsistency include partial writes, storage node crashes, network partitions, multiple reader/writers at multiple sites, and the like. In one embodiment, customers may specify different encoding to achieve different cost, capacity, and reliability trade-offs. For example, temporary, easily-re-created data could be stored with minimal redundancy and cost, archival data could be widely dispersed to improve reliability, storage could offer eventual consistency semantics, and the like. In one embodiment, a storage system can provide different types of redundancy and consistencies under different operating conditions (e.g., replication of data, RAID, erasure coding, and the like).

A seventh capability relates to performance and overload within the context of the self-reliable architecture. In many cases, demand for service varies with time, thereby resulting in the performance being unpredictable. It will be appreciated that provisioning a data center for peak load conditions that are only sustained for a small percentage of the operating time of the data center will result in utilization of the data center resources. As a result, pay as you go schemes (e.g., paying by hour for computing resources) may be preferred. The pay-as-you-go approach, however, also may have problems associated therewith (e.g., the demand is unknown in advance (e.g., there may be large spike in the beginning followed by steady traffic), the hours purchased via cloud can vary non-uniformly in time, and the like). Additionally, many services also experience seasonal or periodic demand variation (e.g. ecommerce in December, unexpected demands due to news events, and the like). Furthermore, performance degradation may be due to failures, overload or design (e.g., loss of transaction availability due to a planned, controlled overload policy control, traffic overload, variation in I/O performance between VMs, I/O interference between VMs, and the like, as well as various combinations thereof).

An eighth capability relates to power management and hardware life within the context of the self-reliable architecture. In some cases, data centers may have a large number of users on a large number of servers (e.g., thousands of servers supporting millions of users). In many such cases, power and cooling is a major problem and expense. In one embodiment, various portions of the infrastructure may be made more efficient via use of software stacks, scalable storage, server blocks with dense blades, disaggregated memory blades with flash-based non-volatile memory, cross layer power management, and the like, as well as various combinations thereof. In one embodiment, hardware life can be extended through software strategies such as automated disk defragmentation that prevents or delays one of the most common causes of customer complaints and the like.

A ninth capability relates to system availability and business continuity within the context of the self-reliable architecture. It is noted that continuity is another factor, because management of cloud computing service by a single company is a single point of failure (e.g., even with multiple data centers in different locations, it has common software infrastructure, accounting, and other common elements and capabilities). In one embodiment, a business continuity strategy is supported. In one such embodiment, the business continuity strategy may specify more than just data recovery, because in most cases data is only one component of a true business continuity and disaster recovery plan.

Although primarily described as independently as separate capabilities, it is noted that various combinations of such capabilities may be used together to provide various functions.

Figure 10:
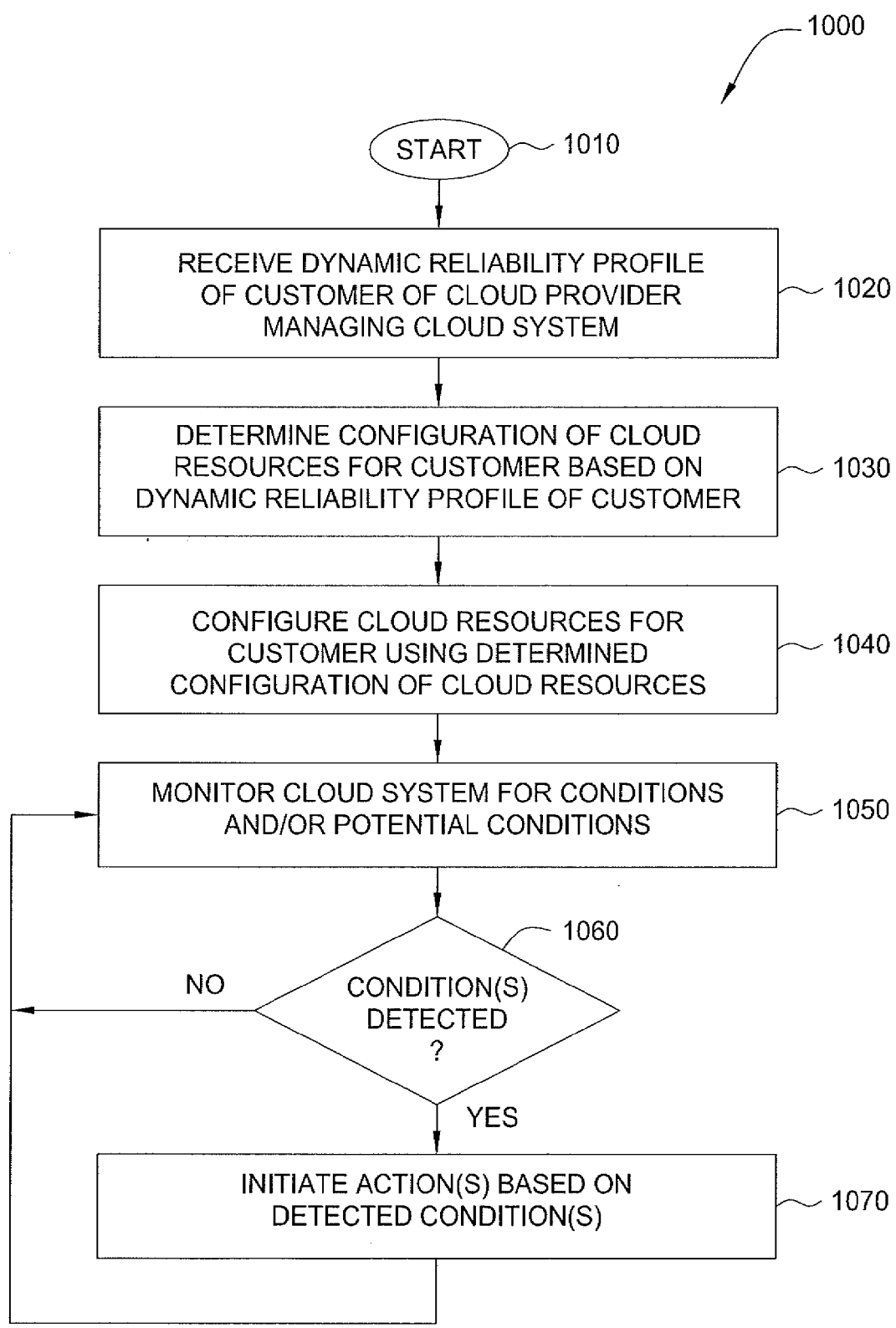
FIG. 10 depicts one embodiment of a method for providing reliability for a customer of a cloud system.

FIG. 10 depicts one embodiment of a method for providing reliability for a customer of a cloud system. It is noted that the various steps of method 1000 may be better understood when considered in conjunction with the relevant portions of FIG. 1 through FIG. 9 depicted and described herein.

At step 1010, method 1000 begins.

At step 1020, a DRP of a customer is received. The customer may be a customer of a cloud provider managing a cloud system.

At step 1030, a configuration of cloud resources for the customer is determined based on the DRP of the customer.

At step 1040, cloud resources are configured for the customer using the determined configuration of cloud resources.

At step 1050, the cloud system is monitored for conditions and/or potential conditions.

At step 1060, a determination is made as to whether one or more conditions have been detected. If no conditions have been detected, method 1000 returns to step 1050 (i.e., monitoring of the cloud system for conditions and/or potential conditions continues). If a condition has been detected, method 1000 proceeds to step 1070.

At step 1070, one or more actions is initiated based on the detected condition(s). From step 1070, method 1000 returns to step 1050 (i.e., monitoring of the cloud system for conditions and/or potential conditions continues).

It is noted that, within cloud systems, reliability is merely one component to be considered (e.g., other components which may be considered include performance, security, cost, and the like). Thus, although primarily depicted and described herein with respect to consideration of the reliability and availability aspects of cloud systems, it will be appreciated that the various principles, capabilities, and functions depicted and described herein with respect to improving reliability and availability aspects of cloud systems may be extended to handle one or more such other considerations (e.g., performance, security, cost, and the like).

Although primarily depicted and described herein within the context of cloud systems, it is noted that various capabilities and functions depicted and described herein may be adapted for use in other environments. For example, various capabilities and functions depicted and described herein within the context of cloud systems may be adapted for use in machine-to-machine environments, smart metering environments, and the like.

Figure 11:
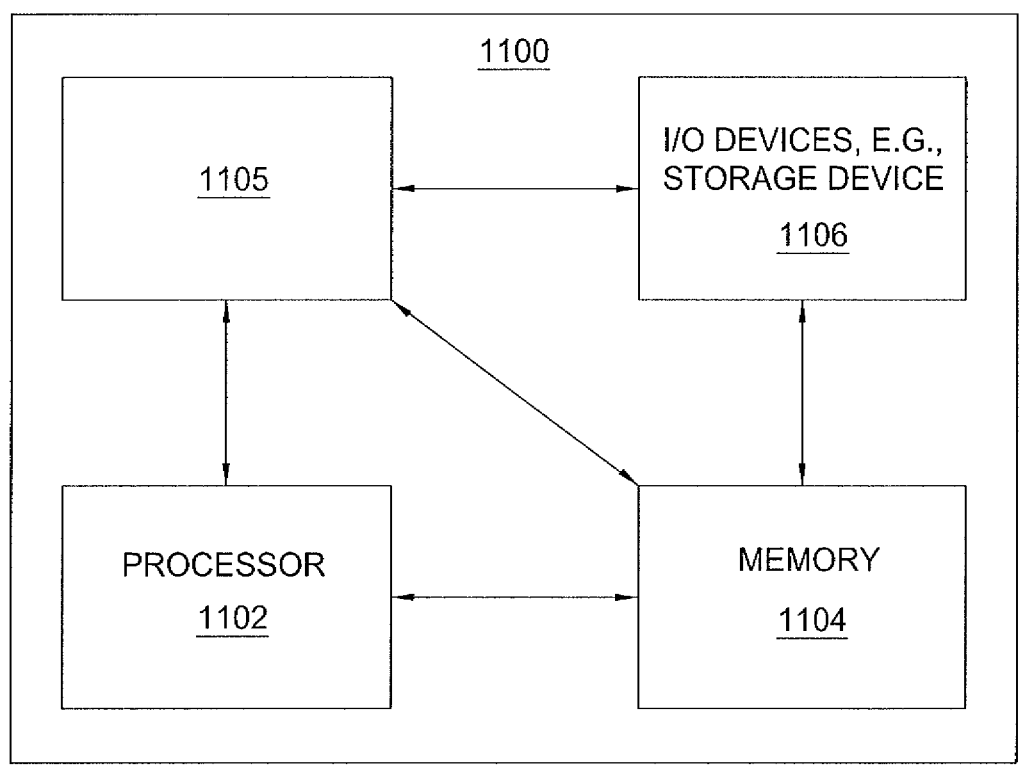
FIG. 11 depicts a high-level block diagram of a computer suitable for use in performing functions described herein.

FIG. 11 depicts a high-level block diagram of a computer suitable for use in performing functions described herein.

As depicted in FIG. 11, computer 1100 includes a processor element 1102 (e.g., a central processing unit (CPU) and/or other suitable processor(s)) and a memory 1104 (e.g., random access memory (RAM), read only memory (ROM), and the like). The computer 1100 also may include a cooperating module/process 1105 and/or various input/output devices 1106 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or may be implemented in hardware (e.g., using a general purpose computer, one or more application specific integrated circuits (ASIC), and/or any other hardware equivalents).

It will be appreciated that the functions depicted and described herein may be implemented in software (e.g., for executing on a general purpose computer (e.g., via execution by one or more processors) so as to implement a special purpose computer) and/or may be implemented in hardware (e.g., using one or more application specific integrated circuits (ASIC) and/or one or more other hardware equivalents).

In one embodiment, the cooperating process 1105 can be loaded into memory 1104 and executed by the processor 1102 to implement functions as discussed herein. Thus, cooperating process 1105 (including associated data structures) can be stored on a computer readable storage medium, e.g., RAM memory, magnetic or optical drive or diskette, and the like.

It will be appreciated that computer 1100 depicted in FIG. 11 provides a general architecture and functionality suitable for implementing functional elements described herein and/or portions of functional elements described herein. For example, the computer 1100 provides a general architecture and functionality suitable for implementing one or more of the various physical resources, modules, units, elements, components, and the like depicted and described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
receive, by a device of a cloud system of a cloud provider, a dynamic reliability profile (DRP) of a customer of the cloud provider, wherein the DRP of the customer specifies reliability parameters of the customer as a function of both time and requirements of an application or service of the customer;
determine, by the device of the cloud system of the cloud provider, a configuration of cloud resources for the customer based on the DRP of the customer, wherein, to determine the configuration of cloud resources for the customer based on the DRP of the customer, the processor is configured to:
determine a virtual topology for the application or service of the customer based on the DRP of the customer, the virtual topology comprising a set of components of the application or service and, for each of the components of the set of components of the application or service, one or more associated reliability requirements of the respective component of the application or service;
determine a reliability map for the application or service of the customer based on the virtual topology for the application or service of the customer; and
determine the configuration of cloud resources for the customer based on the reliability map for the application or service of the customer and
initiate, by the device of the cloud system of the cloud provider, configuration of physical infrastructure of the cloud system of the cloud provider based on the configuration of cloud resources for the customer.

2. The apparatus of claim 1, wherein the DRP of the customer is configured to be specified as a portion of a Service Level Agreement (SLA) associated with the customer.

3. The apparatus of claim 1, wherein the cloud resources comprise at least one of computing resources, memory resources, input-output resources, storage resources, and network resources.

4. The apparatus of claim 1, wherein the processor is configured to:
  determine the virtual topology for the application or service of the customer based on cloud system information associated with the cloud system of the cloud provider;
  determine the reliability map for the application or service of the customer based on cloud system information associated with the cloud system; and
  determine the configuration of cloud resources for the customer based on cloud system information associated with the cloud system.

5. The apparatus of claim 4, wherein the cloud system information comprises current system status information associated with the cloud system and at least one of policy information and constraint information.

6. The apparatus of claim 4, wherein the reliability map for the application or service of the customer is expressed as a Reliability Block Diagram (RBD) configured to represent the components of the application or service of the customer in terms of the respective one or more associated reliability requirements of the respective components of the application or service of the customer and in terms of at least one relationship between the components of the application or service of the customer.

7. The apparatus of claim 1, wherein the processor is configured to determine the configuration of cloud resources for the customer in each of a plurality of time periods.

8. The apparatus of claim 1, wherein the processor is further configured to:
  monitor behavior of the cloud resources for determining whether the reliability parameters of the customer specified in the DRP of the customer are being satisfied.

9. The apparatus of claim 1, wherein the processor is further configured to:
  meter the behavior of the cloud resources for satisfying the reliability parameters of the customer specified in the DRP of the customer.

10. The apparatus of claim 1, wherein the reliability map comprises an arrangement of the components of the application or service based on the associated reliability requirements of the respective components of the application or service.

11. The apparatus of claim 10, wherein the configuration of cloud resources for the customer comprises a mapping of the components of the application or service onto physical infrastructure of the cloud provider.

12. The apparatus of claim 1, wherein the processor is configured to provide a monitoring engine configured to:
  generate, using system status information associated with the cloud system of the cloud provider and at least one of policy information and constraint information specified by the cloud provider of the cloud system, at least one of a reliability integrity meter and control information configured for use in controlling the cloud resources of the cloud system.

13. The apparatus of claim 12, wherein the monitoring engine comprises:
  an aggregation engine configured to receive and aggregate events associated with physical infrastructure of the cloud system;
  a correlation analysis engine configured to correlate the aggregated events to form the system status information associated with the cloud system; and
  a processing engine configured to process the system status information associated with the cloud system and at least one of policy information and constraint information specified by the cloud provider of the cloud system to generate at least one of the reliability integrity meter and the control information configured for use in controlling the cloud resources of the cloud system.

14. The apparatus of claim 12, wherein the reliability integrity meter comprises at least one of the system status information and metrics derived from the system status information.

15. The apparatus of claim 12, wherein the control information configured for use in controlling the cloud resources of the cloud system comprises at least one of reactive control information configured to react to at least one condition in the cloud system and predictive preventative control information configured to prevent at least one condition from occurring in the cloud system.

16. The apparatus of claim 1, wherein the processor is configured to provide a control engine configured to:
  receive control information configured for use in controlling the cloud resources; and
  generate, using the control information, at least one feedback action configured to modify at least a portion of the cloud resources.

17. The apparatus of claim 1, wherein the processor is configured to support a Compute Store Unit (CSU), wherein the CSU comprises at least one of:
  a virtual machine comprising virtual processor and memory resources;
  a virtual storage volume comprising virtual storage resources;
  a virtual sub-network interface configured to support at least one secure connection with at least one other SCU;
  a virtual reliability/security guardian (VRSG) configured to perform at least one of:
    managing recovery of elements of the CSU; and
    exchanging at least one of reliability, security, performance, topology, and event data with at least one other CSU;
  a virtual probe configured to collect at least one of utilization, reliability, performance, and security data for the CSU;
  a controller configured to manage the CSU; and
  a CSU specification comprising a plurality of attributes of the CSU.

18. The apparatus of claim 1, wherein the processor is disposed on a physical host, wherein the processor is configured to support a System Control Unit (SCU) for the physical host, wherein the SCU comprises at least one of:
  a Host Manager (HM) configured to perform at least one of managing actions on the physical host, creating and deleting Compute Store Units (CSUs) for use on the physical host, and enforcing secure communications between CSUs on the physical host and at least one other physical host;
  a Resource Manager (RM) configured to manage resources on the physical host;
  a Storage Manager (SM) configured to manage storage on the physical host;
  a physical reliability/security guardian (PRSG) configured to monitor and manage recovery of CSUs on the physical host; and a physical probe configured to collect at least one of utilization, reliability, performance, and security data associated with the physical host.

19. A non-transitory computer-readable storage medium storing instructions which, when executed by a computer, cause the computer to perform a method, the method comprising:

receiving, by a device of a cloud system of a cloud provider, a dynamic reliability profile (DRP) of a customer of the cloud provider, wherein the DRP of the customer specifies reliability parameters of the customer as a function of both time and requirements of an application or service of the customer; and determining, by the device of the cloud system of the cloud provider, a configuration of cloud resources for the customer based on the DRP of the customer, wherein, to determine the configuration of cloud resources for the customer based on the DRP of the customer, the processor is configured to:

determining a virtual topology for the application or service of the customer based on the DRP of the customer, the virtual topology comprising a set of components of the application or service and, for each of the components of the set of components of the application or service, one or more associated reliability requirements of the respective component of the application or service;

determining a reliability map for the application or service of the customer based on the virtual topology for the application or service of the customer; and determining the configuration of cloud resources for the customer based on the reliability map for the application or service of the customer; and initiating, by the device of the cloud system of the cloud provider, configuration of physical infrastructure of the cloud system of the cloud provider based on the configuration of cloud resources for the customer.

20. A method, comprising:

using a processor and a memory for:

receiving, by a device of a cloud system of a cloud provider, a dynamic reliability profile (DRP) of a customer of the cloud provider, wherein the DRP of the customer specifies reliability parameters of the customer as a function of both time and requirements of an application or service of the customer;

determining, by the device of the cloud system of the cloud provider, a configuration of cloud resources for the customer based on the DRP of the customer, wherein, to determine the configuration of cloud resources for the customer based on the DRP of the customer, the processor is configured to:

determining a virtual topology for the application or service of the customer based on the DRP of the customer, the virtual topology comprising a set of components of the application or service and, for each of the components of the set of components of the application or service, one or more associated reliability requirements of the respective component of the application or service;

determining a reliability map for the application or service of the customer based on the virtual topology for the application or service of the customer; and determining the configuration of cloud resources for the customer based on the reliability map for the application or service of the customer; and initiating, by the device of the cloud system of the cloud provider, configuration of physical infrastructure of the cloud system of the cloud provider based on the configuration of cloud resources for the customer.

* * * * *